April 18, 1939.  E. J. COOK  2,154,974
DUPLICATING MACHINE
Filed Jan. 11, 1937  12 Sheets-Sheet 1

INVENTOR
EVERETT J. COOK
BY Whittemore Hulbert & Belknap
ATTORNEYS

April 18, 1939.  E. J. COOK  2,154,974
DUPLICATING MACHINE
Filed Jan. 11, 1937   12 Sheets-Sheet 2
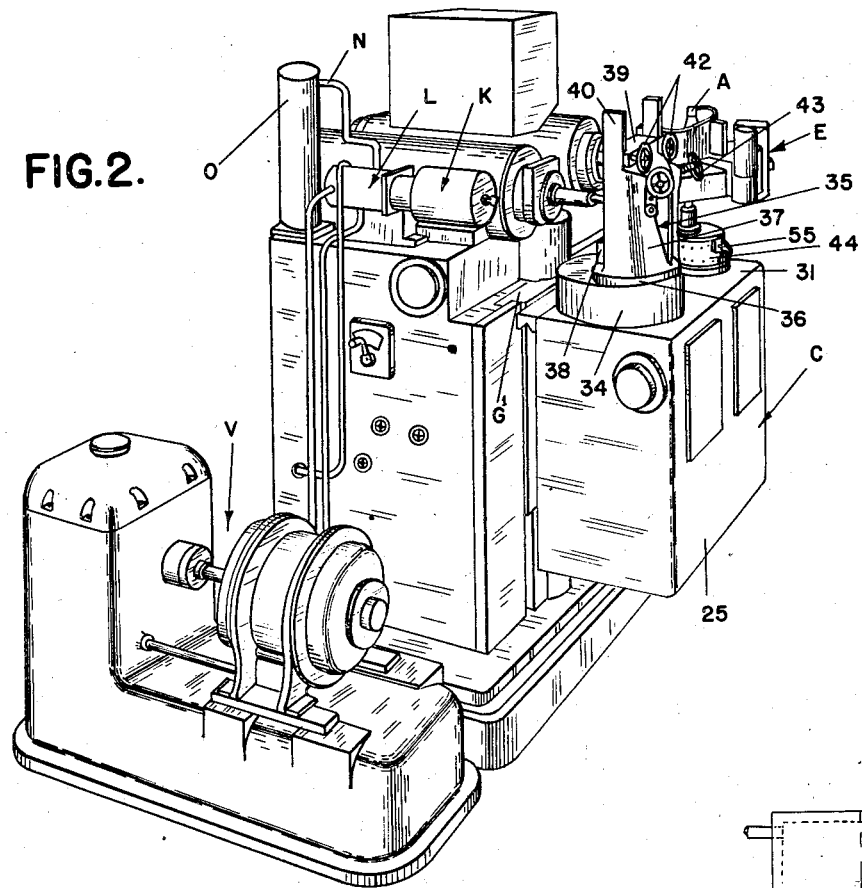
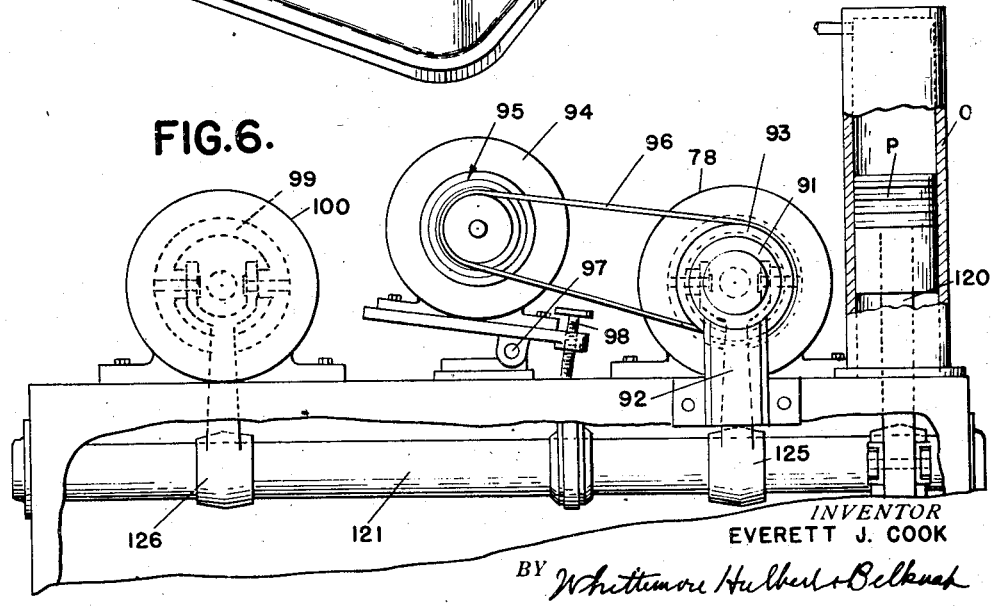
INVENTOR
EVERETT J. COOK
BY *Whittemore Hulbert & Belknap*
ATTORNEYS April 18, 1939. E. J. COOK 2,154,974

DUPLICATING MACHINE

Filed Jan. 11, 1937 12 Sheets-Sheet 5

INVENTOR
EVERETT J. COOK
BY Whittemore Hulbert & Belknap
ATTORNEYS

April 18, 1939.　　　　E. J. COOK　　　　2,154,974
DUPLICATING MACHINE
Filed Jan. 11, 1937　　12 Sheets-Sheet 6
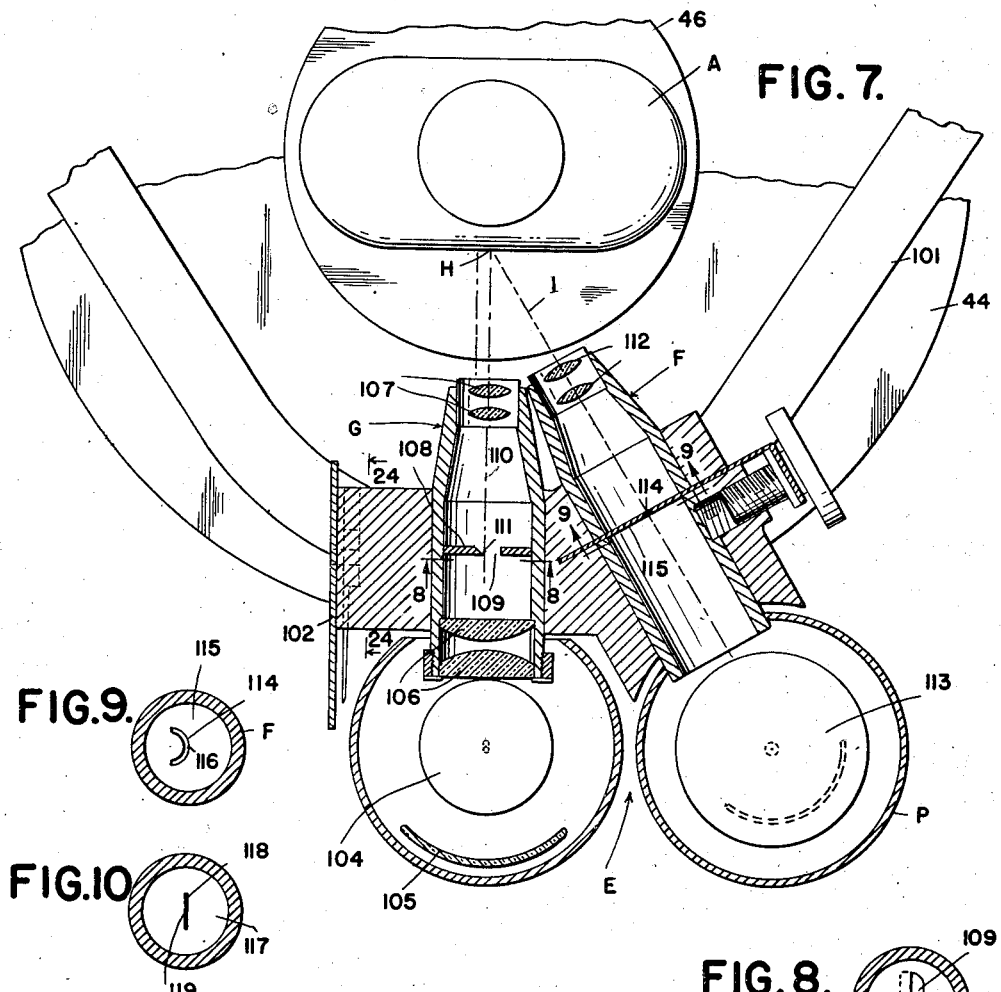
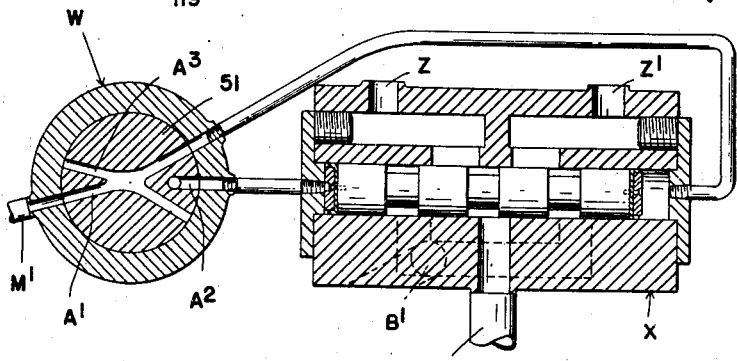
INVENTOR
EVERETT J. COOK
ATTORNEYS April 18, 1939.  E. J. COOK  2,154,974
DUPLICATING MACHINE
Filed Jan. 11, 1937  12 Sheets-Sheet 7

INVENTOR
EVERETT J. COOK
BY Whittemore Hulbert & Belknap
ATTORNEYS

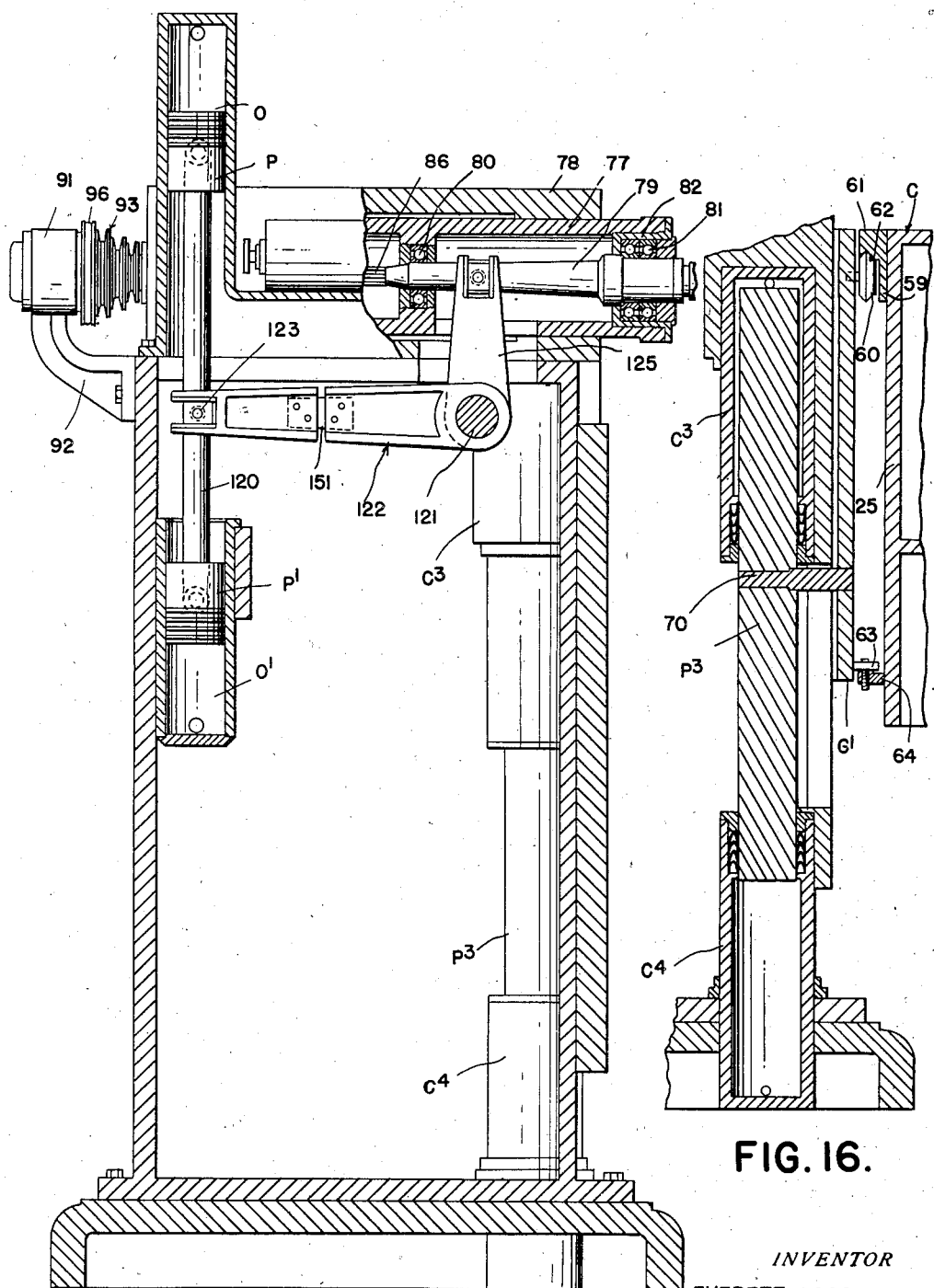

April 18, 1939.  E. J. COOK  2,154,974
DUPLICATING MACHINE
Filed Jan. 11, 1937  12 Sheets-Sheet 9

INVENTOR
EVERETT J. COOK
BY Whittemore Hulbert & Belknap
ATTORNEYS

April 18, 1939.  E. J. COOK  2,154,974
DUPLICATING MACHINE
Filed Jan. 11, 1937  12 Sheets-Sheet 10

INVENTOR
EVERETT J. COOK
BY Whittemore Hulbert & Belknap
ATTORNEYS

April 18, 1939.  E. J. COOK  2,154,974
DUPLICATING MACHINE
Filed Jan. 11, 1937  12 Sheets-Sheet 12

INVENTOR
EVERETT J. COOK
BY Whittemore Hulbert & Belknap
ATTORNEYS

Patented Apr. 18, 1939

2,154,974

UNITED STATES PATENT OFFICE 2,154,974

DUPLICATING MACHINE

Everett J. Cook, Toledo, Ohio, assignor to H. H. Buggie & Company, Toledo, Ohio, a corporation of Ohio Application January 11, 1937, Serial No. 120,134

40 Claims. (Cl. 90—13.5)

This invention relates generally to metal working machines and refers more particularly to an improved duplicating machine.

One of the principal objects of this invention resides in the provision of a duplicating machine embodying a combination of features cooperating with each other to produce an exact replica of a pattern from blank stock and to accomplish this result automatically with the minimum attention on the part of the operator.

The present invention provides for more accurately forming the work to the shape and size of a pattern by employing an optical unit including a photoelectric cell for controlling the feed of the reproducing cutter, and by controlling the operation of the light sensitive cell from an image formed by light reflected from the pattern. In accordance with this invention, the optical unit, in addition to having a light sensitive cell, also includes a projector which casts a light and a shadow upon the pattern to form a sharply defined contour line representing a section of the pattern as viewed from the position of the photoelectric cell at an angle to the axis or center line of the projected light beam.

Another object of this invention consists in the provision of means for effecting relative transverse movement of the optical unit and pattern to cause the light and shadow to progress across the surface of the pattern to produce a series of contour lines representing successive sections of the pattern. With the present invention, the light sensitive cell scans the images of the contour lines as the latter progress across the pattern and is operated in accordance with these contour lines.

Another feature of the present invention consists in effecting relative transverse movement of the work and tool as a unit with the light sensitive cell and pattern, with the result that the tool assumes the same relationship to the work as the light and shadow assumes to the pattern.

Still another object of this invention resides in the provision of means for periodically effecting predetermined increments of movement of the pattern and work relative to the light sensitive cell and tool in a direction longitudinally of the pattern. With this arrangement and the one set forth in the preceding paragraph, the entire surface of the pattern is scanned by the photoelectric cell and, since the latter controls the feed of the cutter in accordance with the images of the contour lines of the pattern, it necessarily follows that the work will be fashioned to the exact form of the pattern.

Another object of the present invention consists in the provision of means for timing the increments of longitudinal feed of both the pattern and work with respect to the transverse travel thereof, so that the longitudinal feed takes place at the end of each transverse movement.

A further object of the present invention consists in maintaining the cutting tool substantially normal to the surface of the work being cut even though this surface is curved, and this is accomplished by effecting movement of both the work and pattern in an arcuate path throughout the transverse feed mentioned above. This feature renders it possible to employ a tapered tool in cutting curved surfaces and offers the possibility of obtaining a straight uniform cut.

Still another object of this invention resides in the provision of a duplicating machine of the character set forth having provision for reversing the direction of arcuate travel of the work and pattern at the end of each transverse feed of the latter elements.

A still further advantageous feature of the present invention consists in the provision of a duplicating machine embodying a fluid pressure system having a master valve operated by the photoelectric cell to control the operation of fluid pressure actuated means connected to both the optical unit and tool for moving the same toward or away from the pattern and work, respectively, depending upon the particular nature of the contour of the pattern.

A further feature of this invention consists in the provision of a fluid pressure system embodying fluid pressure actuated means for effecting transverse movement of the pattern and work in opposite directions and for moving the latter elements vertically with a step by step movement at the end of each transverse travel.

Another object of the present invention consists in the novel means provided in the fluid pressure system for insuring the completion of the feeding traverse of the tool before the pattern and work are moved in the manner set forth above.

The use of fluid pressure means for accomplishing the above results contributes materially to the efficiency and widens the application of the machine, since it not only simplifies the construction of the latter by eliminating complicated inertia correction devices required for accurate results whenever rotating mechanical devices are employed, but also increases the accuracy of the work performed by eliminating the error that would result from the accumulated clearances of mechanical apparatus. In addition, fluid pressure actuated devices lend themselves to finer and more accurate speed variations with less mechanism than would be required with a mechanical system.

In addition to the foregoing, this invention contemplates a machine of the character previously set forth capable of being readily employed for the purpose of engraving the work in accordance with lettering or design contours on the pattern. This particular feature, as well as the foregoing objects and other advantages, will be made more apparent as this description proceeds, especially when considered in connection with the accompanying drawings, wherein:

Figure 2 is a perspective view of a duplicating machine constructed in accordance with this invention;

Figure 6 is a fragmentary elevational view partly in section of a portion of the machine shown in Figure 2;

Figure 7 is an enlarged fragmentary elevational view featuring the photoelectric cell unit in section;

Figure 8 is a cross sectional view taken substantially on the plane indicated by the line 8—8 of Figure 7;

Figure 9 is a cross sectional view taken substantially on the plane indicated by the line 9—9 of Figure 7, and disclosing the diaphragm employed in the illuminating device;

Figure 10 is an elevational view of a slightly modified form of diaphragm;

Figure 12A is a sectional view of the valve assembly for controlling the transverse travel of the work and pattern;

Figure 14 is a sectional view taken substantially on the plane indicated by the line 14—14 of Figure 3;

Figure 15 is a sectional view taken substantially on the plane indicated by the line 15—15 of Figure 4;

Figure 16 is a fragmentary sectional view taken substantially on the plane indicated by the line 16—16 of Figure 3;

While it will be understood as this description proceeds that the present invention is capable of many and diversified uses, nevertheless, for the purpose of illustration I have shown apparatus designed to form bottle molds. It is well established that bottle molds must be accurately formed in order that the containers formed from the molds will hold the proper volume of fluid, and I have selected this particular embodiment of the invention in order to illustrate the extreme accuracy of the machine. In the present instance, the mold is formed of two halves which may, or may not be complementary depending upon the particular contour of the bottle to be formed. However, the principle of operation of the apparatus is the same in forming the two halves of the mold, and for this reason reference will be made hereinafter to the formation of only one-half of the mold.

Figure 1:
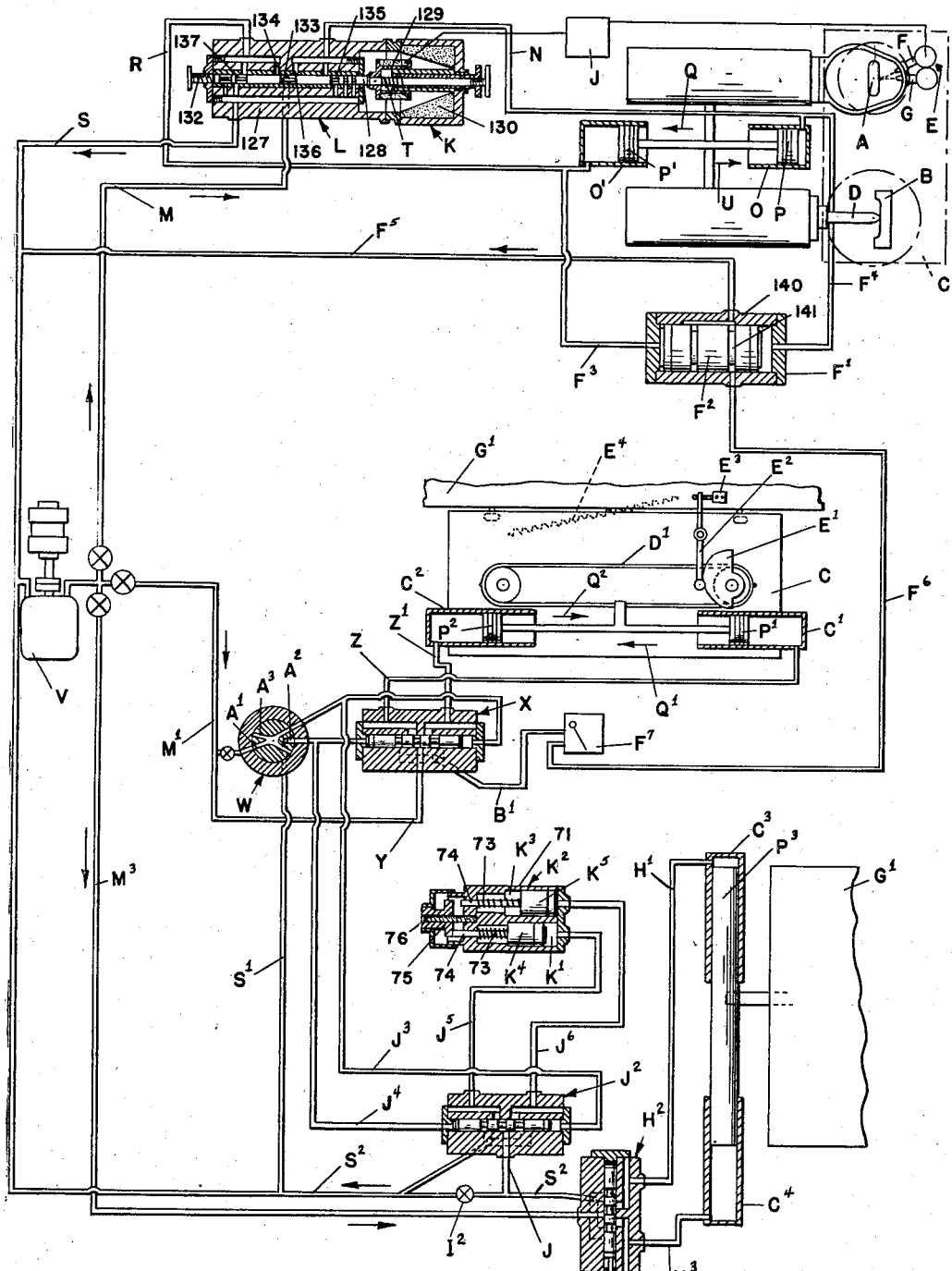
Figure 1 is a diagram showing the several instrumentalities of the machine diagrammatically and illustrating the fluid pressure system employed.

Attention is now directed to the diagram featured in Figure 1 of the drawings, wherein A designates a model preferably covered with an aluminum or some other light colored paint to enhance its reflection qualities and corresponding exactly to the shape of the bottle it is desired to manufacture. Positioned to one side of the pattern A in lateral spaced relation thereto is a work blank B from which one side of the bottle mold is to be formed. Both the pattern and the work are suitably supported upon a carriage C mounted for movement in directions transverse to each other. As will be more fully hereinafter set forth, the carriage C reciprocates in a horizontal direction and is adapted to be fed downwardly by step by step movement. Supported opposite the work B at the inner side of the latter is a tool D having a tapered cutting end for engagement with the inner surface of the work blank B. An optical unit E, comprising a photoelectric cell F and a projector G, is positioned at the outer side of the pattern A opposite the latter. The optical unit is moved relative to the pattern A by fluid pressure actuated means controlled by the optical unit E and having the additional function of correspondingly moving the tool D relative to the work blank B. As will be more fully hereinafter set forth, the arrangement is such that when the optical unit E is moved toward the pattern A, the tool D is withdrawn from the work B and when the optical unit is moved away from the pattern, the tool is fed into the work.

As stated above, the optical unit E comprises a photoelectric cell F and a source of illumination in the form of a projector G. Referring briefly to Figure 7, it will be noted that the projector G casts light and shadow upon the pattern to form a sharply defined contour line H which represents a section of the pattern and is focused by the lenses 112 on the apertured plate 115 of the photoelectric cell device. The photoelectric cell device F is supported at an angle to the projector, and the line of sight I through the aperture 114 in the plate 115 intersects the adjacent edge of the beam of light from the projector at a point spaced a predetermined distance inwardly from the optical unit E. This point of intersection of the line of sight I from the cell F with the beam of light from the reflector corresponds to the contour line H when the relative position of the pattern A and optical unit E is such that the point of intersection is effected on the surface of the pattern. The parts are shown in this relative position in Figure 7 and, as will be presently described, when in this position the image is focused on the plate 115 by the lenses 112 with the contour line H intersecting the aperture 114 through the plate 115. Relative movement of the optical unit and the surface of the pattern scanned from the above noted position causes either the light from the image to pass through the aperture into the cell or effects movement of the image in a direction away from the aperture to diminish the light passing through the aperture depending, of course, upon the direction of relative movement of the pattern and optical unit. The effect of this displacement of the image relative to the apertures 114 will more fully be understood from the following description.

As pointed out above, the carriage C is reciprocated transversely and since this carriage carries the pattern A and work B, it necessarily follows that the latter will also be reciprocated transversely relative to the optical unit E and the tool D. This causes the light and shadow to progress across the surface of the pattern A to produce a series of contour lines representing successive sections of the pattern and effects a corresponding movement of the cutting end of the tool across the work B. The light sensitive cell scans the images of the contour lines as the latter progress across the pattern, with the result that the photoelectric cell controls the operation of the tool D in accordance with these contour lines. It will, of course, be understood from the above that at the end of each transverse movement of the carriage C, the latter is moved vertically a predetermined increment so that the entire surface of the pattern to be reproduced is scanned by the photoelectric cell, and so that the tool D will cut this complete surface in the work B.

Before defining the fluid pressure system disclosed in the diagram featured in Figure 1, reference will be briefly made to the general operation of the optical unit E. The aperture 114 of the light sensitive cell F intercepts the image cast upon the surface of the pattern A by the projector G, and the arrangement is such that when the aperture or line of sight of the cell F intercepts the dark portion of the image, or the shadow, no electric current is built up in the circuit including the light sensitive cell F, with the result that the tool D is fed into the work B in a manner to be more fully hereinafter described.

On the other hand, when the aperture 114 of the photoelectric cell F intercepts any part of the illuminated portion of the image, or the light beam, the photoelectric cell is rendered conductive and sends a signal to the amplifier J. The amplifier J energizes an electromagnet K which, in turn, effects movement of the tool D away from the work B, and causes the optical unit E to move toward the pattern A. As the optical unit E moves toward the pattern, the intensity of the reflected light is decreased causing a corresponding decrease in the power of the electromagnet K, and when the aperture 114 intersects the contour line H focused from the pattern A on the plate 115, movement of the tool away form the work is discontinued. Thus, it will be seen that the aperture 114 of the photoelectric cell F is held in a position on the adjacent edge of the image cast on the pattern by the light beam or, in other words, is held on the contour line H formed by the projected image.

As indicated above, when the light sensitive cell F intercepts the illuminated portion of the image projected by the projector G, the electromagnet K is energized through the amplifier J to move both the optical unit E and tool D. It will be noted from Figure 1 that as the electromagnet K is energized, a master valve L is moved to a position to open communication between a fluid pressure supply line M and the conduit N. The conduit N communicates with the cylinder O to effect movement of the piston P in the cylinder in the direction of the arrow Q. The piston P is operatively connected to an opposed piston P' operating in a cylinder O' having the pressure end communicating with the master valve by means of a conduit R. When the master valve is in position to supply fluid under pressure into the cylinder O at the pressure side of the piston P, the conduit R is connected to the return line S by the valve so as to permit exhausting fluid under pressure from the cylinder O'. Both the pistons are diagrammatically shown in Figure 1 as connected to the optical unit E and tool D so as to not only effect movement of the tool D in a direction away from the work B, but to also cause the optical unit E to move in a direction toward the pattern A.

When the aperture 114 of the photoelectric cell intercepts the dark portion of the image, or the shadow, the electromagnet K is de-energized causing the spring T to move the valve L to a position wherein communication is established between the supply line M and the conduit R to the pressure side of the cylinder O'. It will, of course, be understood that the latter movement of the valve also connects the conduit N with the return line S for exhausting the pressure side of the cylinder O. This causes the pistons to move in the direction of the arrow U to feed the tool D into the work B, and to move the optical unit E at a corresponding rate in a direction away from the pattern A.

At the same time the fluid under pressure is supplied to the supply line M from the pump unit V, fluid under pressure is also supplied to the line $M^1$. The fluid supply line $M^1$ communicates with a pilot valve W and with a four-way valve X through the medium of a conduit Y. The piston of the four-way valve X is actuated from the fluid pressure supply line $M^1$ through the pilot valve W, and the latter is automatically actuated in a manner to be presently described. As shown in Figure 1, the four-way valve has two outlet conduits Z and Z' communicating respectively with the high pressure ends of a pair of opposed cylinders $C^1$ and $C^2$. The arrangement is such that when the pivot valve W is rotated to the position thereof shown in Figure 1, the passage $A^1$ through the valve establishes communication between the fluid supply line $M^1$ and the valve X at the rear side of the valve piston. At the same time, the exhaust passage $A^2$ in the pilot valve W establishes communication between the valve X at the front side of the piston and the return line $S^1$ in order to exhaust fluid pressure from the valve X in advance of the piston. As a result, the piston of the valve X moves in a forward direction to connect the fluid pressure line Y with the conduit Z communicating with the high pressure side of the cylinder $C^1$ to effect movement of the piston $P^1$ in the direction of the arrow $Q^1$. The piston $P^1$ is operatively connected to the piston $P^2$ in the opposed cylinder $C^2$ and, in the above mentioned position of the piston of the valve X, the high pressure side of the cylinder $C^2$ is connected to the exhaust conduit $B^1$ through the valve X in order to permit both pistons to move in the direction of the arrow $Q^1$. On the other hand, when the control valve W is revolved in the opposite direction to its other extreme position, the passage $A^3$ through the valve connects the fluid supply line $M^1$ to the cylinder of the valve X in advance of the valve piston, and the exhaust passage $A^2$ communicates with the valve cylinder at the rear side of this piston. Thus, the valve piston is caused to move in a rearward direction and communication is established from the supply line Y to the conduit Z' to build up a pressure in the cylinder $C^2$ against the piston $P^2$. At the same time, the high pressure side of the opposed cylinder $C^1$ is connected through the valve X to the exhaust conduit $B^1$ permitting the two pistons to be moved in the direction of the arrow $Q^2$.

Upon reference to Figure 1, it will be noted that the two opposed pistons are connected to an endless tape $D^1$ reeved around pulleys carrying the face plates upon which the pattern A and work B are supported. The construction is such that movement of the pistons in the two directions mentioned above effects an oscillation of both the pattern A and the work B relative to the optical unit E and tool D. This oscillatory movement is advantageous in cutting arcuate surfaces, since it renders it possible to maintain the tool substantially normal to the work throughout the entire cutting operation.

Figure 3:
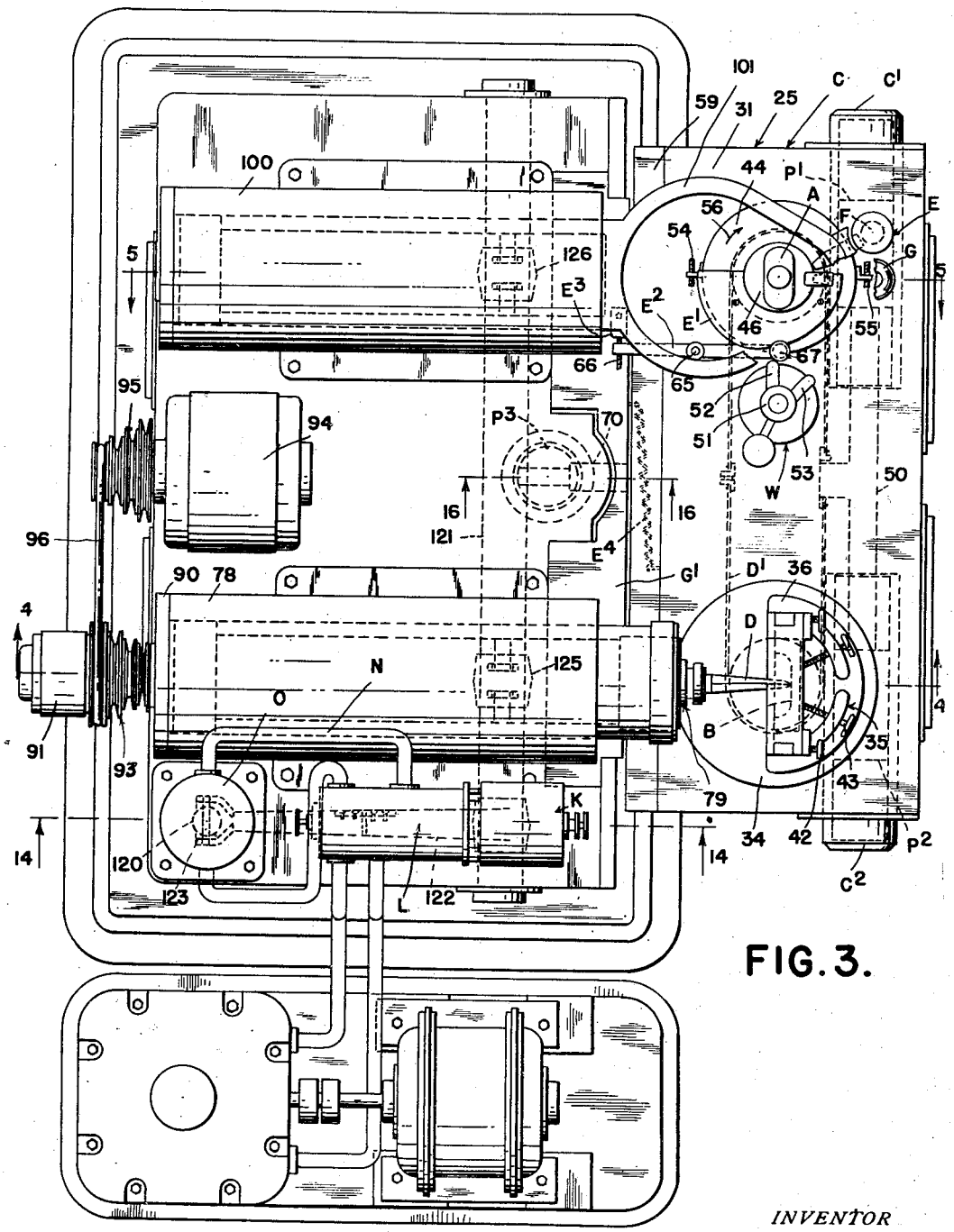
Figure 3 is a plan view of the machine shown in Figure 2.

From the foregoing, it will be noted that the oscillation of both the pattern A and tool B is effected by fluid pressure and is controlled by the valve W. Although the valve W is shown diagrammatically in Figure 1 as positioned a substantial distance from the face plate carrying the pattern A, nevertheless, in actual practice, the valve W is positioned adjacent to the face plate for the pattern A and is automatically actuated by the latter. The relative position of the pattern face plate and control valve W is shown in Figure 3, and the arrangement is such that the valve W is rotated at the end of each oscillation of the pattern face plate. As will be more fully hereinafter set forth when the pattern face plate approaches its extreme positions, it operates the valve W to effect the flow of fluid pressure through the valve X required to oscillate the face plates in the opposite direction.

Attention is also called to the fact at this time that rotation of the pattern face plate also effects the transverse feed of the carriage C carrying both the pattern and work supporting face plates. This is accomplished by securing a cam $E^1$ to the pattern face plate for rotation therewith as a unit. The cam acts upon the free end of an arm $E^2$ pivotally connected intermediate its ends on the carriage C and having the free end abutting a fixed support $E^3$. The contour of the cam $E^1$ varies in accordance with the particular contour of the pattern A but, in any event, effects a transverse movement of the carriage C through the lever $E^2$ in one direction at the same time the face plates are oscillated. Although the cam controls the return feed of the carriage C through the arm $E^2$, nevertheless, actual movement of the carriage in this direction is effected by means of a spring $E^4$ connecting the carriage with a fixed part of the machine.

It has been stated that one of the features of the present invention consists in holding the face plates and carriage C stationary during the interval the tool is being fed into the work. Briefly, this is accomplished by preventing the flow of exhaust from the conduit $B^1$ to the return line S until movement of the tool D into the work is completed. In detail, a stop valve $F^1$ is provided having a cylinder and a piston $F^2$ reciprocably mounted in the cylinder. One end of the cylinder is connected to the conduit R by means of a conduit $F^3$, and the other end of the cylinder is connected to the conduit N through the medium of a conduit $F^4$. It will also be observed that one side of the cylinder communicates with the return line S through the medium of a conduit $F^5$ and the opposite side of the cylinder is connected by means of a conduit $F^6$ to the conduit $B^1$ through the medium of a speed control valve $F^7$. The construction is such that when the tool D is being fed into the work B by fluid pressure admitted into the cylinder O' from the conduit R, fluid pressure is also discharged through the line $F^3$ into the four-way valve cylinder at the front side of the piston $F^2$. When the master valve L is in a position wherein fluid under pressure is admitted from the supply line M to the conduit R, the conduit N is connected through the valve L to the return line S, and since the line $F^4$ communicates with the conduit N, it necessarily follows that fluid under pressure in the four-way valve cylinder at the rear side of the piston $F^2$ will also exhaust through the valve L to the return line S. As a result, the piston $F^2$ moves to its rearwardmost position in the four-way valve cylinder and closes the conduit $F^6$ communicating with the exhaust line $B^1$. In view of the fact that both of the cylinders $C^1$ and $C^2$ exhaust through the line $B^1$ and, since one or the other of these cylinders must exhaust in order to effect movement of the pattern and work, it necessarily follows that the latter will be held stationary while the tool D is being fed into the work. However, as soon as the tool reaches its limit of movement into the work or, in other words, as soon as the line of sight of the photoelectric cell F intercepts the projected image on the edge of the latter corresponding to the contour line, the electromagnet K is energized sufficiently to move the master valve L to a position wherein fluid under pressure is admitted to the conduit N and is exhausted from the conduit R. This introduces fluid pressure through the conduit F⁴ into the four-way valve cylinder at the rear side of the piston F² and permits exhausting fluid pressure from the opposite side of the four-way valve cylinder through the conduit F³. Owing to the construction of the four-way valve shown, a slight movement of the valve piston F² in a forward direction connects the exhaust line F⁶ with the exhaust conduit F⁶ and permits continued operation of the carriage C and face plates supporting the pattern A and work B.

Reference has also been made above to the fact that the pattern A and work B are moved as a unit in a vertical direction relative to the optical unit E and tool D. In the present instance, the pattern A and work B are moved downwardly by step by step movement and the latter is effected by the fluid pressure actuated piston P³ connected to a slide G¹ which, in turn, supports the carriage C. It will be observed from Figure 1 that the opposite ends of the piston P³ are slidably supported in a pair of opposed upper and lower cylinders C³ and C⁴. The top cylinder C³ is connected by a conduit H¹ to one end of a manually operated four-way valve H², and the lower cylinder C⁴ is connected to the opposite end of the four-way valve H² by the conduit H³. The four-way valve H² receives fluid pressure from a third supply line M³ connected to the pump unit V and to the four-way valve intermediate the ends of the latter. When the machine is in operation, the piston of the four-way valve H² is located in the position thereof shown in Figure 1, wherein the high pressure end of the cylinder C³ is connected to the fluid pressure supply line M³, and wherein the cylinder C⁴ is connected to the exhaust line S².

The exhaust line S² is normally closed by a valve I² causing the exhaust from the cylinder C⁴ to pass through the conduit J¹ to the four-way valve J². The four-way valve J² is automatically actuated by the control valve W in such a manner that the increments of movement of the slide G¹ take place at the end of the travel of the carriage C in each direction. Upon reference to Figure 1, it will be noted that the rear end of the cylinder of the four-way valve J² communicates with the supply line for the corresponding end of the four-way valve X through the medium of a conduit J³ so that when the piston of the latter valve moves forwardly to oscillate the plates in the direction of the arrow Q¹, the piston of the valve J² will move in a corresponding direction to the position thereof shown in Figure 1. The forward end of the cylinder of the valve J² is connected by means of a conduit J⁴ to the supply line for the forward end of the four-way valve X in such a manner that when fluid under pressure is supplied by the control valve W to the forward end of the valve X, fluid pressure will also be supplied to the corresponding end of the valve J². In other words, when the piston of the valve X is moved rearwardly to effect oscillation of the carriage in the direction of the arrow Q², the piston of the valve J² is moved in a corresponding direction.

When the piston of the valve J² is moved forwardly by the control valve W, exhaust from the cylinder C⁴ is admitted through the valve J² to a conduit J⁵ communicating with the chamber K¹ of a metering valve K². On the other hand, when the piston of the valve J² is moved rearwardly, exhaust from the cylinder C⁴ is admitted through the valve J² to the conduit J⁶ communicating with a second chamber K³ in the metering valve K². The chamber K¹ has a piston K⁴ slidably mounted therein, and the chamber K³ has a similar piston K⁵ therein. As will be more fully hereinafter set forth, these pistons are adjusted to provide for discharging a predetermined volume of fluid in each chamber and the increments of downward movement of the slide G¹ are controlled by the respective volumes of the chambers K¹ and K³.

It will be observed from the above that exhaust from the cylinder C⁴ is alternately discharged into the chambers K¹ and K³ in accordance with the operation of the four-way valve J² by the control valve W. It will be understood from Figure 1 that when the piston of the valve J² is in its forwardmost position, the chamber K³ is connected through the valve J² to the exhaust line S² in advance of the valve I², with the result that the chamber K³ is exhausted at the time that the chamber K¹ is filled with fluid under pressure from the cylinder C⁴. On the other hand, when the piston of the valve J² is in its rearwardmost position to supply fluid from the cylinder C⁴ to the chamber K³, the chamber K¹ is connected through the valve J² to the exhaust line S² in advance of the valve I² in order to permit exhausting the chamber K¹. Thus it will be noted that at each end of transverse travel of the carriage C, the piston P³ is lowered an amount depending upon the volume of one of the measuring valve chambers, and since the piston P³ is connected to the carriage C through the medium of the vertical slide G¹, it necessarily follows that the pattern A and work B will be moved accordingly. In the event it is desired to effect a sudden movement of the pattern A and work B downwardly, the valve I² is opened permitting the cylinder C⁴ to exhaust independent of the measuring valve K².

Figure 4:
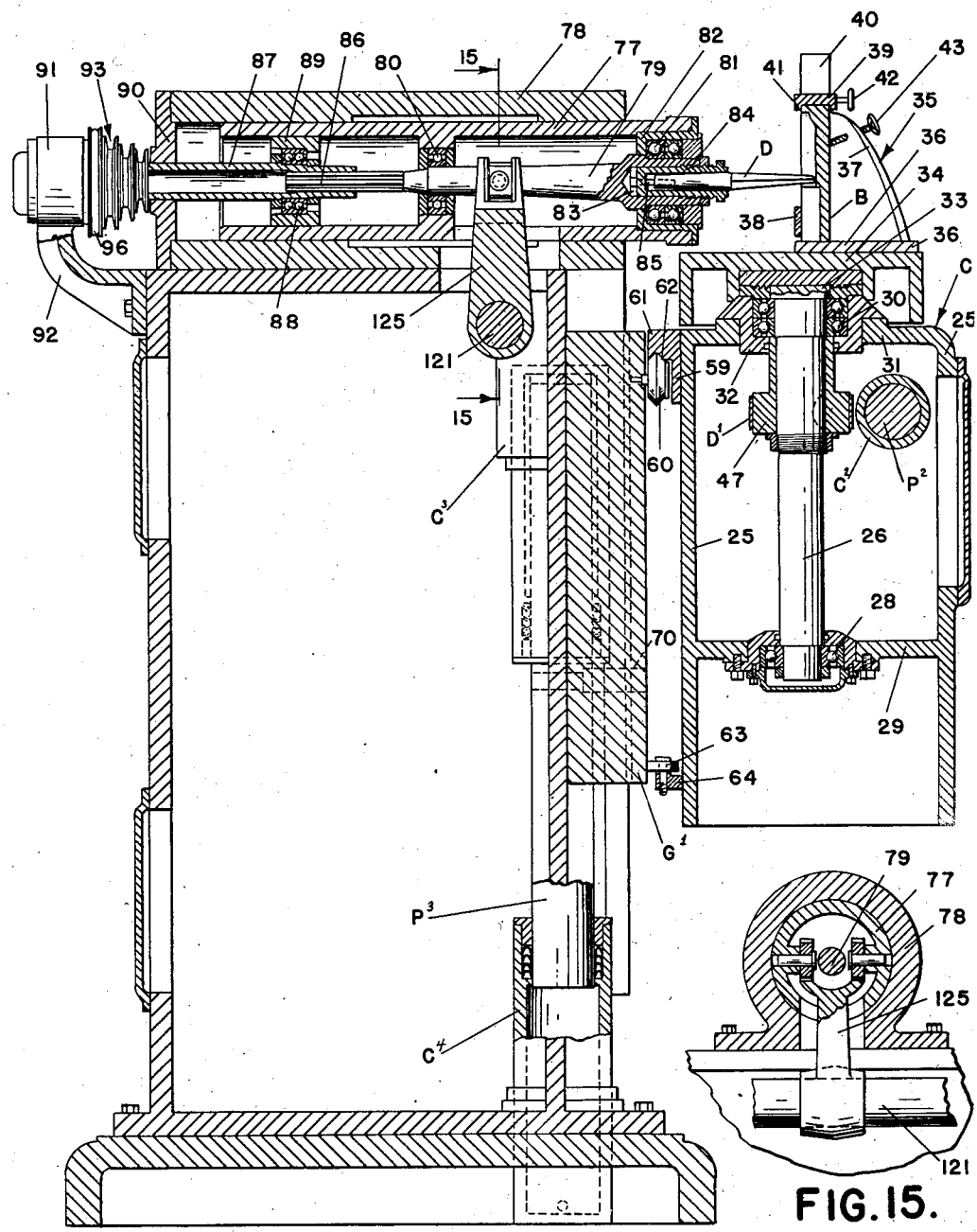
Figure 4 is a cross sectional view taken substantially on the plane indicated by the line 4—4 of Figure 3.
Figure 5:
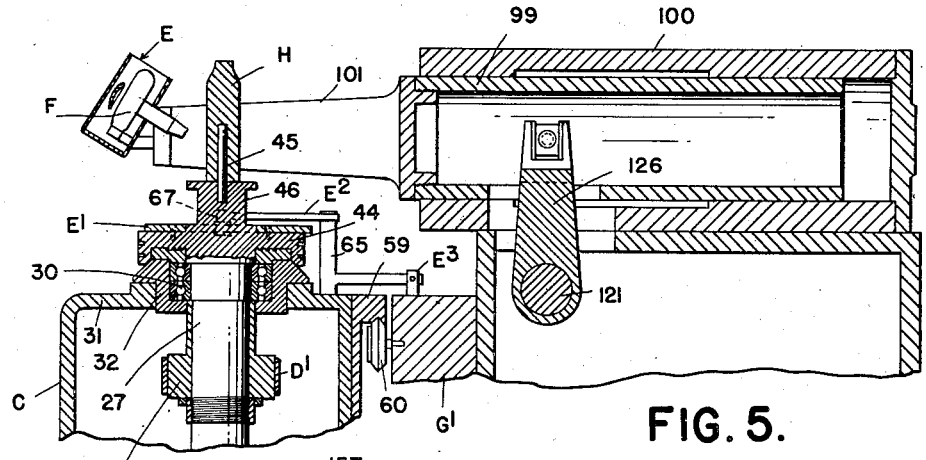
Figure 5 is a fragmentary sectional view taken substantially on the plane indicated by the line 5—5 of Figure 3.
Figure 18:
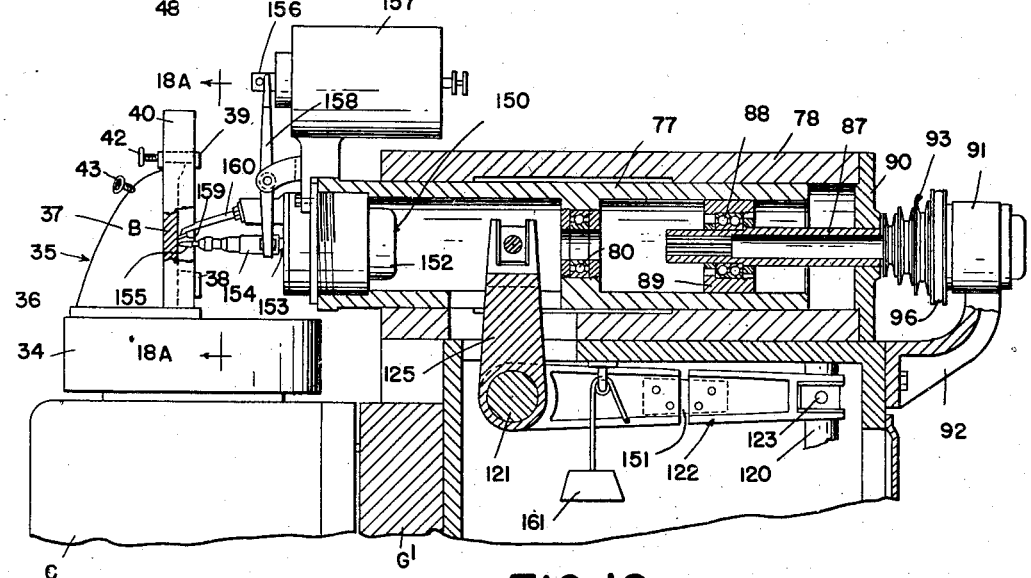
Figure 18 is a longitudinal sectional view similar to Figure 4, with the exception that an engraving head is substituted for the cutting tool spindle.
Figure 19:
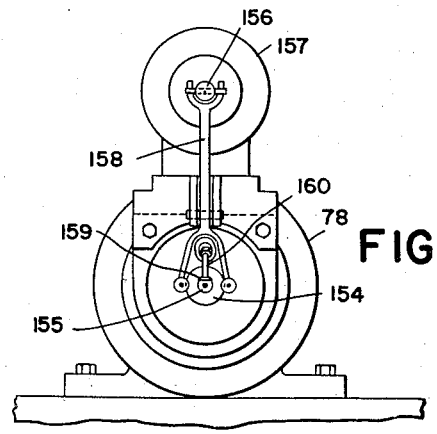
Figure 19 is a front elevational view of the engraving tool attachment.
Figure 24:
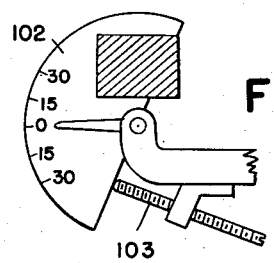
Figure 24 is a section taken on line 24—24 of Figure 7.
Figures 17, 20A:
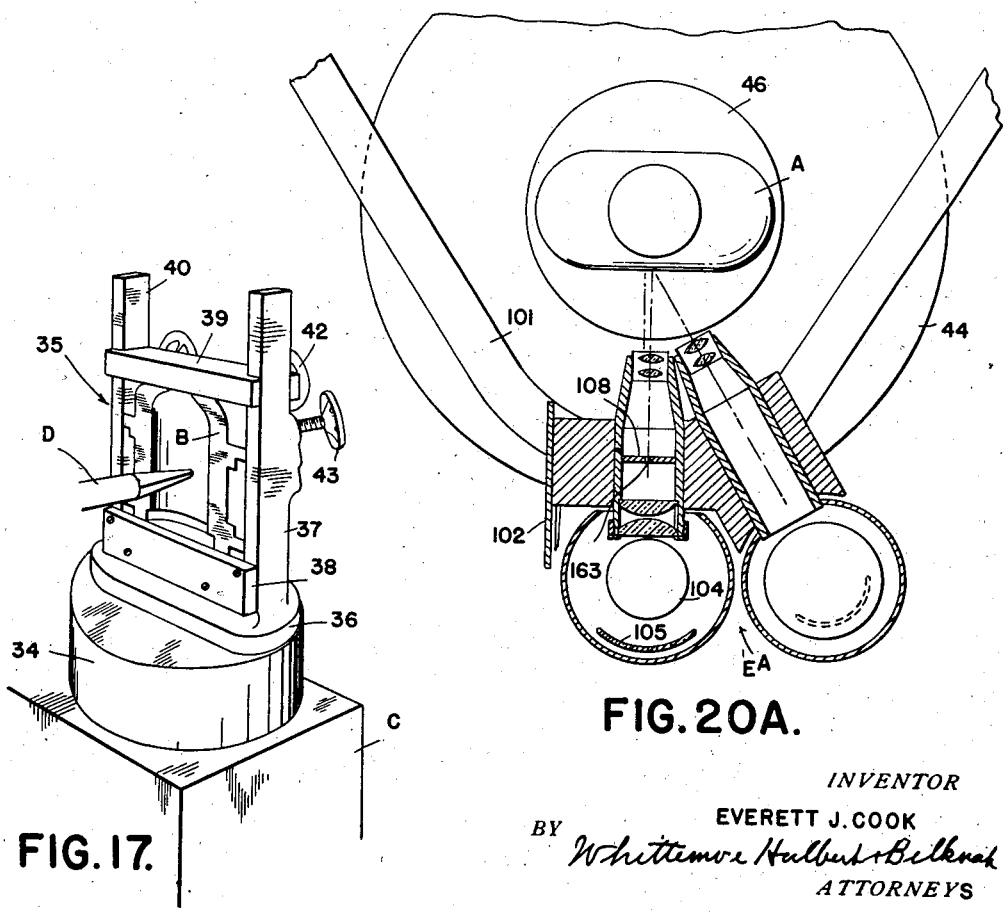
Figure 17 is a perspective view of the work holding clamp.
Figure 20A is a sectional view of the optical unit illustrating the position of the latter relative to the pattern containing the surface to be engraved on the work.

Referring now more in detail to the particular construction of the machine selected herein for the purpose of illustration, attention is called to Figures 2 to 5 inclusive, wherein it will be noted that the carriage C is in the form of a housing 25 supporting a pair of vertical shafts 26 and 27 in lateral spaced relationship. The lower ends of the shafts are journalled in bearings 28 carried by a horizontal partition 29 in the housing, and the upper ends of the shafts are journalled in bearings 30 secured to the top wall 31 of the housing by means of the retainers 32. The shaft 26 extends above the top wall 31 of the housing and is provided with an enlarged portion 33 having a face plate 34 secured thereto for rotation as a unit with the shaft 26. The face plate 34 carries a clamp 35 for securing the work B to the face plate and the construction of this clamp is shown in Figures 2 and 17. It will be observed from the latter figures that the clamp is provided with a base 36 secured in any suitable manner to the top of the face plate 34 and having upwardly projecting side walls 37 adapted to extend around the work B at the outer side of the latter. The portions of the side walls adjacent the base 36 are connected by means of a bar 38 adapted to assume a position at the inner side of the work piece B, and the upper ends of the side walls are connected by means of a bar 39 slidably supported on extensions 40 projecting upwardly from the side walls. The bar 39 is shown in Figure 4 as having a downwardly extending flange 41 for engagement with the inner side of the work piece in the operative position of the bar. The bar 39 is held in its operative position by means of a pair of clamping screws 42 threadedly mounted in opposite ends of the bar and engageable with the extensions 40 to hold the bar in place. The work piece is clamped against the lower bar 38 and the depending flange 41 by means of similar clamping screws 43 threaded in the side walls 37 for engaging the outer surface of the work piece B. Thus, it will be seen that the work piece is effectively clamped to the face plate 34 for rotation as a unit with the shaft 26.

In the present instance, the shaft 27 also extends beyond the upper wall 31 of the housing 25 and is provided with an enlarged portion 44 forming a face plate for the pattern A. In the present instance, the pattern A is in the form of a bottle coated with aluminum paint to enhance its reflection qualities and provided with a centrally arranged depending projection 45 at the bottom thereof for engagement in a recess provided in an upwardly projecting extension 46 of the face plate 44. The arrangement is such as to provide rotation of the pattern A as a unit with the shaft 27.

It has been stated above that the face plates carrying the work and pattern are oscillated by means of the action of the opposed pistons $P^1$ and $P^2$ on the continuous tape $D^1$. In the present instance, the continuous tape $D^1$ is reeved around pulleys 47 and 48 respectively secured to the shafts 26 and 27 within the housing 25.

The fluid pressure actuated means for operating the tape to oscillate the shafts is mounted on the carriage. As shown in Figure 3, the opposed cylinders $C^1$ and $C^2$ are secured to the opposite side walls of the housing in axial alignment with each other at the outer side of the tape $D^1$ directly opposite the latter. The pistons $P^1$ and $P^2$ respectively reciprocably mounted in the cylinders $C^1$ and $C^2$ are secured together by means of a connecting rod 50 having a portion intermediate the ends secured to the outer side of the tape $D^1$ at a point substantially midway between the shafts 26 and 27. The valve W for controlling the direction of movement of the tape through the four-way valve X is mounted upon the top wall 31 of the carriage C in a position adjacent the face plate 44 on the shaft 27. The rotor 51 of the control valve W has secured thereto a pair of arms 52 and 53. The arms are spaced from each other circumferentially of the rotor and are adapted to be respectively engaged by the adjustable pins 54 and 55 secured to the face plate 44 at opposite sides of the latter. The arrangement is such that as the face plate 44 approaches the end of its travel in the direction of the arrow 56, the pin 55 engages the arm 52 to move the rotor 51 of the control valve to a position wherein fluid pressure is admitted to the cylinder $C^2$ and is exhausted from the cylinder $C^1$. As defined above, when the foregoing condition exists, the tape $D^1$ is moved in the opposite direction to effect a rotation of the face plate 44 in a corresponding direction until the pin 54 engages the arm 53 on the rotor 51 to locate the latter in a position wherein the action of the fluid pressure in the cylinders is again reversed. Inasmuch as the face plate 34 is connected to the tape, it necessarily follows that the pattern A and work B will be oscillated as a unit in corresponding directions.

Reference has also been made above to the fact that the carriage C reciprocates in a horizontal plane during the interval of oscillation of the face plates. Upon reference to Figures 2 and 4 of the drawings, it will be noted that the carriage C is slidably supported on a vertical slide $G^1$ by means of a track 59 secured to the inner wall of the carriage adjacent the upper end of the latter and rollers 60 secured to the outer wall of the slide $G^1$. The track 59 extends for the full length of the carriage and is provided with an inwardly extending flange 61 having a groove 62 of substantially V-shaped cross section in the bottom side thereof for receiving the correspondingly shaped peripheries of the rollers 60. The lower end of the carriage C is positioned relative to the slide $G^1$ by means of rollers 63 carried by brackets 64 secured to the inner wall of the carriage.

In the present embodiment of the invention, the carriage C is reciprocated horizontally during the oscillatory motion of the face plates by means of the cam $E^1$ secured to the face plate 44 for rotation as a unit therewith. As briefly described above, the cam operates through the arm $E^2$ and fixed stop $E^3$ to effect the desired transverse feed of the carriage. In detail, the arm $E^2$ is pivotally connected intermediate the ends thereof on the carriage by means of a pin 65, and the inner end of the arm is provided with an adjustable screw 66 for engagement with the stop $E^3$. The other end of the arm is provided with a follower 67 engageable with the cam surface for actuation thereby. The follower 67 is maintained in engagement with the cam $E^1$ by means of the spring $E^4$ having one end secured to the carriage and having the opposite end secured to the slide $G^1$. It follows from the above that the transverse feed of the carriage is controlled by the contour of the cam $E^1$, and this contour will vary in accordance with variations in the shape of the particular pattern it is desired to duplicate.

Figure 12:
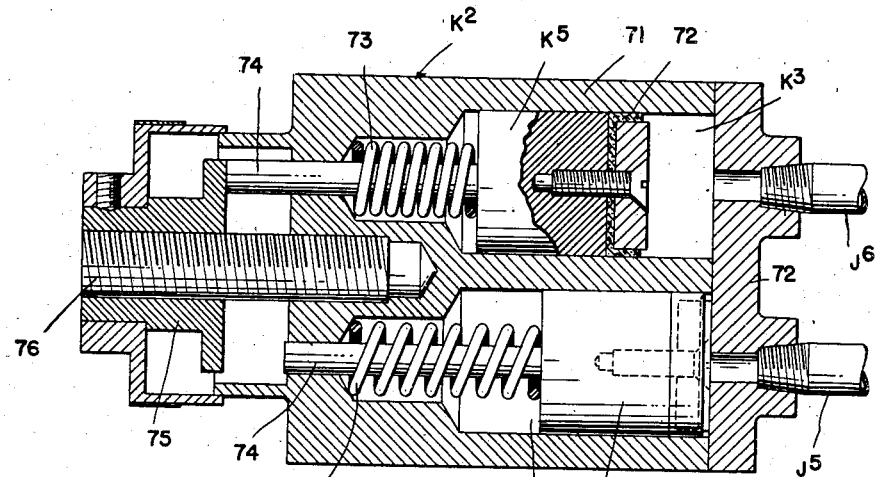
Figure 12 is a longitudinal sectional view through the metering valve employed to actuate the vertical travel of the pattern and work.

Reference has also been made above to the fact that the carriage is advanced in a downward direction by step by step movement at the end of the transverse feed of the carriage in each direction. As shown in Figures 3, 4 and 16, the vertical slide $G^1$ is connected by means of a pin 70 to the piston $P^3$ having the opposite ends reciprocably mounted in the cylinders $C^3$ and $C^4$. The upper cylinder $C^3$ is secured in any suitable manner to the upper end of the frame of the machine and communicates with the hydraulic system shown in Figure 1 through the medium of the supply line $H^1$. The lower cylinder $C^4$ is secured to the base of the machine frame in axial alignment with the cylinder $C^3$ and is filled with the hydraulic medium in order to normally support the carriage C in its uppermost position through the slide $G^1$ and piston $P^3$. The lower end the cylinder $C^4$ communicates with the metering valve $K^2$ and the exhaust of the hydraulic medium in the cylinder $C^4$, or the increments of downward movement of the carriage C, is actually controlled by the metering valve $K^2$. This metering valve is shown in Figure 12 as having a casing 71 fashioned to provide the two chambers $K^1$ and $K^3$ alternately communicating with the cylinder $C^4$ in dependence upon the actuation of the control valve W. As hereinbefore stated, when the control valve is in one of its extreme positions, the chamber $K^1$ is connected to the cylinder $C^4$, and when the control valve W is in the other of its extreme positions, the chamber $K^3$ is connected to the cylinder $C^4$. The chambers are of a predetermined capacity, and this capacity may be varied by adjusting the stroke of the pistons $K^4$ and $K^5$ in the chambers $K^1$ and $K^3$, respectively. Both pistons are effectively sealed, as at 72, to prevent the escape of fluid from the chambers past the pistons and are normally urged in a rearward direction to close the chambers by means of coil springs 73 surrounding suitable rods 74 secured to the forward ends of the pistons. The rods are slidably supported in the forward end of the casing 71 and are adapted to engage an adjustable abutment 75 when the pistons have been moved by fluid under pressure to their forwardmost positions against the action of the springs 73. The abutment 75 is threaded upon a stud 76 projecting from the forward end of the valve casing 71, and adjustment of the abutment axially of the stud limits and travel of the pistons in the chambers $K^1$ and $K^2$. It will, of course, be understood that the above also varies the effective volume or capacity of the portions of the chamber available for the exhaust fluid from the cylinder $C^4$ and this, in turn, results in varying the increments of downward advancement of the carriage C. Attention is also called to the fact that the abutment 75 positions both pistons so that the effective capacity of both chambers will always be the same, and this results in uniform increments of advancement of the carriage.

The cutting tool assembly is supported upon the top of the machine frame and comprises a tool carrying plunger 77 reciprocably mounted in a tubular guide 78 fixed in any suitable manner to the machine frame. The guide 78 is located directly opposite the face plate 34 at the inner side of the latter to permit movement of the plunger 77 toward and away from the work B supported on the face plate 34. Positioned axially within the tubular plunger 77 is a spindle 79 having a portion adjacent the inner end thereof journalled in a bearing 80 secured within the plunger 77 intermediate the ends of the latter and having the outer end journalled in a double bearing 81 secured in the corresponding end of the plunger 77 by means of the retainer 82. Upon reference to Figure 4, it will be noted that the outer end of the spindle is formed with an axially extending recess 83 having a threaded portion for securing the retainer 84 for the tool D to the spindle. The tool D is held in assembled relation within the retainer by means of a fastener element 85 having a head portion engaging the inner end of the retainer within the recess 83 and having a shank portion threadedly secured within an axial recess formed in the inner end of the tool D. It will also be observed from Figure 4 that the inner end of the spindle 79 beyond the bearing 80 is splined, as at 86, and telescopically engages within a correspondingly splined portion of a tubular drive shaft 87. The drive shaft 87 is journalled in a double bearing 88 secured within the plunger 77 adjacent the inner end of the latter by means of the retainer 89. The extreme inner end of the drive shaft 87 extends though the inner end wall 90 of the tubular guide 78 and is journalled in a bearing carried by the bracket 91 having an arm 92 secured to the machine frame. The portion of the bracket housing the bearing for the inner end of the drive shaft is spaced axially inwardly from the wall 90 of the tubular guide 78, and a series of pulleys 93 of varying diameters are secured to the drive shaft between the bracket 91 and wall 90 of the tubular guide. As shown in Figure 3, the tool carrying spindle 79 is rotated by means of an electric motor 94 secured to the top of the machine frame and having a plurality of driving pulleys 95 corresponding in number to the number of pulleys in the series 93, and oppositely arranged with respect to the latter pulleys in accordance with the practice usually adopted when variations in speed are desired. The series of pulleys 93 are adapted to be successively connected to the pulleys 95 by means of the belt 96. In the present instance, the base of the electric motor 94 is shown in Figure 6 is pivotally connected, as at 97, to the machine frame and the pivot is so located with respect to the center of gravity of the motor that the weight of the latter tends to maintain the belt 96 under tension. The belt 96 is prevented from rocking the motor 94 about the pivot 97 by means of an adjustable thumb screw 98 threadedly supported in the motor base and engageable with the top of the machine frame.

With the above construction, the tool carrying spindle may be reciprocated during the rotation thereof, and in the present instance the reciprocation of the tool is effected by the action of the optical unit E. Upon reference to Figure 5, it will be noted that the optical unit E is carried by a plunger 99 mounted for reciprocation on an axis extending parallel to the axis of reciprocation 77 and supported by means of a guide 100 secured to the machine frame at the inner side of the pattern A directly opposite the latter. Inasmuch as the present invention is primarily concerned with forming a mold for objects having the contour of the pattern A, it is necessary to support the photoelectric cell opposite the pattern A at the outer side of the latter, and this is accomplished by providing a yoke 101 secured to the outer end of the plunger and encircling the pattern A in the manner clearly shown in Figure 3.

A photoelectric cell device F and the projector G are fixedly supported with respect to each other on a quadrant 102 pivotally supported on the outer end of the yoke 101 and adjustable through the medium of the screw 103 to vary the angular relationship in a vertical plane between the surface of the pattern to be duplicated and the beam of projected light and line of sight of the photoelectric cell device. This adjustment is particularly advantageous in the present instance in that it renders it possible to locate the optical unit E in a position relative to the pattern A to insure casting a more direct beam of light on the inwardly curved shoulder of the pattern A.

Upon reference to Figure 7, it will be noted that the projector G comprises an electric lamp 104, a reflector 105, condenser lenses 106, objective lenses 107, and an opaque mask 108 located between the condenser lenses and the objective lenses. The mask 108 is formed with a slot 109 elongated at right angles to the axis 110 of the projected light beam and having a straight edge 111 intersecting the axis 110. It will also be noted that the axis 110 is preferably arranged in a common plane with the axis of oscillation of the pattern A, and this is desirable in that it maintains the light beam in the most advantageous position with respect to the surface of the pattern to be duplicated during oscillation of the pattern.

With the above construction, it will be noted that the projector casts light and a shadow on the pattern and also that the straight verical edge 111 of the slot 109 in the mask 108 provides a sharp line of demarcation between the shadow and light. As pointed out above, this edge of the projected image forms the contour line representing the particular section of the surface of the pattern viewed from the position of the photoelectric cell device F.

The photoelectric cell device F is provided with focusing lenses 112, and is so positioned that the center line of the lenses 112, or the line of sight I of the cell, intersects the edge of the projected image formed by the straight side 111 of the slot 109 in the mask 108 at a point spaced a predetermined distance inwardly from the optical unit. The image created by the reflection of light from the pattern is sighted by the light sensitive cell 113 through an aperture 114 formed in a diaphragm 115 extending perpendicular to the line of sight I, and is adjustably secured to the photoelectric cell F to provide for varying the location of the aperture relative to the line of sight I. It will be noted that the width of the aperture 114 is extremely small and that a point on the edge 116 of the aperture is located directly on the line of sight I. As pointed out above, the construction is such that the aperture 114 intercepts the contour line of the image representing a particular section of the pattern and when the aperture intercepts the dark portion or shadow of the image, the tool D is fed into the work in the manner clearly pointed out above. On the other hand, when the aperture intercepts any part of the illuminated portion of the image, the light sensitive cell 113 sends a signal to the amplifier J which energizes the electromagnet K to effect withdrawal of the tool in accordance with the foregoing description. It will, of course, be understood that the optical unit E is movable as a unit with the tool in the opposite direction so that the tool will be fed in one direction and then the other until the line of sight I assumes a position on the edge of the projected image corresponding to the contour line of the surface of the pattern to be duplicated.

It will be noted from Figure 9 that the aperture is semi-circular in shape and, in the present instance, the outer contour corresponds to the radius of the cutting end of the tool D. This arrangement insures location of the cutting portion of the tool with the work at a point exactly corresponding to the point of intersection of the line of sight I, with the edge of the projected light beam on the surface of the pattern. However, in some cases, the arcuate nature of the aperture 116 may not permit sufficient passage of light to effect the required operation of the electromagnet required to move the tool and, in cases of this character, the diaphragm 117 may be substituted for the one shown in Figure 10. This diaphragm is provided with a vertical substantially narrow slot 118 therethrough, and this slot is so located that the edge 119 thereof assumes a position on the line of sight I. With patterns of certain contour, the diaphragm 117 is desirable in that it permits the passage of more light from the image to the light sensitive cell 113. For example, if the surface of the pattern embodies a relatively sharp curve, it is possible that an arcuate aperture of the type shown in Figure 9 would not properly register with the contour line and, as a result, the amount of light passed by the aperture may be insufficient to properly operate the tool. Of course in this case, the diaphragm 117 would be used.

It has been stated above that when the cutter is moved in a direction toward the work B, the optical unit E is moved in a direction away from the pattern and, when the cutter is withdrawn from the work, the optical unit is moved toward the pattern. As pointed out in connection with the diagram featured in Figure 1, both of the aforesaid movements are effected at a corresponding rate by the fluid pressure actuated pistons P and P'. Upon reference to Figure 14, it will be noted that the axially aligned opposed cylinders O and O' are secured to the machine frame with their common axes extending vertically. The pistons P and P' respectively reciprocably mounted in the cylinders O and O' are connected together for movement as a unit by a rod 120 having a portion intermediate the pistons connected to a rockshaft 121 journalled in the frame with its axis extending at right angles to the axes of the reciprocable plungers 77 and 99. The connection between the rod 120 and rockshaft 121 comprises an arm 122 having one end secured to the rockshaft and having the opposite end pivotally connected to the rod 120 by means of the pin 123. As shown in Figure 4, the piston rod 120 is connected to the tool plunger 77 carrying the spindle 79 by means of an arm 125 having one end secured to the rockshaft 121, and having the other end pivotally connected to the plunger 77 at a point spaced outwardly from the bearing 80. With this construction, it will be noted that as the piston P is moved downwardly by the action of fluid under pressure, the tool carrying spindle 79 is moved away from the work B by the plunger 77. On the other hand, when the piston P' is moved upwardly, the plunger 77 and tool carrying spindle will move as a unit toward the work B. The splined connection between the inner end of the tool carrying spindle 79 and the outer end of the drive shaft 87 permits the above mentioned reciprocable movement of the tool carrying spindle relative to the drive shaft without disturbing rotation of the spindle by the drive shaft.

The optical unit E is moved as a unit with the tool carrying spindle from the rockshaft 121 by means of an arm 126 having one end secured to the rockshaft 121 and having the other end pivotally connected to the plunger 99. This construction, of course, provides for movement of the plunger 99 in the same direction and at the same rate as the tool carrying spindle 79. However, since the optical unit E is supported at the outer side of the pattern and the tool D is supported at the inner side of the work, it necessarily follows that when the tool is moved into the work, the optical unit E is moved away from the pattern and, when the tool is withdrawn from the work, the optical unit E is moved towards the pattern.

Figure 11:
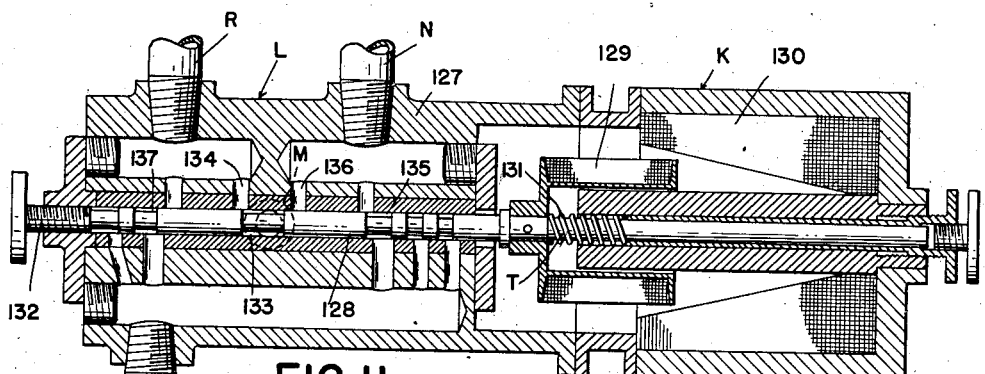
Figure 11 is a longitudinal sectional view through the master valve of the hydraulic system.

The flow of fluid under pressure to the cylinders O and O' is controlled by the valve L shown in Figure 11 as comprising a casing 127 and an axially reciprocable plunger 128 supported in the casing. The valve L is secured to the top of the machine frame, and the outer end of the plunger is connected to the armature 129 of the electromagnet K normally urged in a direction away from the field 130 by means of the coil spring 131. The coil spring 131 normally maintains the inner end of the valve piston in engagement with an adjustable stop 132, wherein communication is established between the fluid supply line M and the conduit R communicating with the cylinder O'. In the same position noted above, communication is established between the exhaust line S and the cylinder O through the conduit N, the result being that the pistons are moved upwardly causing the tool D to move toward the work B, and the optical unit E to move away from the pattern A. Communication through the valve L to effect the above results is accomplished in the following manner. It will be noted from Figure 11 that the valve piston is provided with a reduced portion 133 opposite the fluid pressure supply line M and having a length so determined that when the valve piston is actuated by the spring to engage the adjustable stop 132, the same communicates with the conduit R through the medium of a passage 134. It will also be noted that the valve piston is formed with a reduced portion 135 normally registering with the exhaust line S and operable upon movement of the valve piston in the above named direction to connect the exhaust line S to the conduit N. There are additional reduced portions in the valve piston adjacent the ends of the latter and communicating with the exhaust line S to permit the return of any fluid escaping past the piston.

When the electromagnet 130 is energized, the armature 129 is withdrawn into the field 130 and the valve piston 128 is moved to its other extreme position, wherein the reduced portion 133 establishes communication between the source of fluid pressure supply M and the conduit N through the port 136. This, of course, supplies fluid under pressure to the cylinder O above the piston P. At the same time, the reduced portion 137 of the valve piston establishes communication between the exhaust line S and the conduit R communicating with the cylinder O'. Thus, it will be seen that the latter is exhausted permitting the pistons to move in a direction to cause the tool to move away from the work and to effect movement of the optical unit E toward the pattern A.

Figures 13, 23:
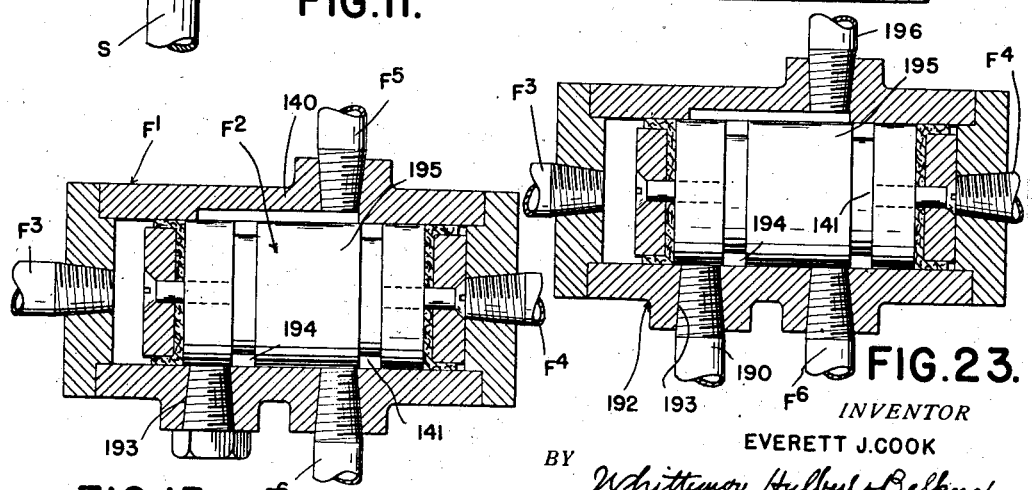
Figure 13 is a longitudinal sectional view through the stop valve employed to prevent movement of the pattern and work during the interval the tool is being fed into the work.
Figure 23 is a sectional view through the stop valve illustrated diagrammatically in Figure 21.

It has been previously stated that at the same time fluid pressure is introduced into the cylinder O' to effect movement of the tool D into the work, the stop valve F¹ is actuated to prevent transverse movement of the carriage C. The valve F¹ is shown in Figure 13 as comprising a casing 140 and a piston F² reciprocably mounted in the casing. The opposite ends of the casing 140 are respectively connected to the fluid pressure supply lines R and N by means of the conduits F³ and F⁴. With this arrangement, it will be noted that when fluid pressure is admitted to the cylinder O' for moving the pistons in a direction to feed the tool D into the work, fluid pressure is also supplied to the end of the stop valve cylinder communicating with the conduit F³. As a result, the piston F² is moved to the end of the stop valve cylinder connected to the conduit F⁴, wherein the annular groove 141 in the piston is out of registration with the conduit F⁶, previously defined as the exhaust line for the carriage actuating cylinders C¹ and C². Consequently, the latter cylinders will be prevented from exhausting, and movement of the piston and work is discontinued until the tool D has been fed to its proper extent into the work. When the tool D reaches its proper depth of cut, continued movement of the same toward the work is checked by admission of fluid pressure into the cylinder O and since the stop valve casing 140 communicates with the cylinder O by means of the conduit F⁴, it necessarily follows that the piston F² will be moved slightly toward the opposite end of the stop valve casing. This slight movement is sufficient to register the annular groove 141 with the conduits F⁵ and F⁶ and thereby permits the carriage actuating cylinders to be operated in the usual manner.

Reference has been made above to the fact that the present invention contemplates utilizing the above principle of operation for engraving the work, and this is accomplished herein by merely substituting an engraving head 150 for the tool spindle assembly 79. This substitution may be readily effected by merely unscrewing the bearing retainer from the outer end of the plunger 77, whereupon movement of the assembly axially outwardly with respect to the plunger disengages the splines 86 from the drive shaft 87. The engraving head is then merely threaded in the outer end of the plunger 77 and the pistons P and P' are disconnected from the plungers 77 and 99. In order to permit readily disconnecting the reciprocable plungers 77 and 99 from the piston actuating rod 120, the arm 122 is formed of two sections secured together by a plate 151. Thus, it will be apparent that removal of the plate 151 disconnects the rockshaft 121 from the piston actuated rod 120.

The engraving head 150 comprises an electric motor 152 having a split drive shaft 153 for slidably receiving the shank 154 of the engraving tool 155. The shank 154 of the engraving tool is operatively connected to the plunger 156 of an electromagnet 157 connected to the amplifier K for actuation by the optical unit E. The connection between the shank 154 of the engraving tool and the magnetically operated plunger 156 comprises an arm 158 pivotally supported intermediate its ends for swinging movement about an axis extending at right angles to the axis of rotation of the engraving tool. The upper end of the arm 158 is operatively connected to the plunger 156, and the lower end of the arm is operatively connected to the shank 154 of the tool. The engraving head is positioned with respect to the work B by means of a roller 159 carried by the outer end of an arm 160 having the inner end secured to the engraving head. This roller rides on the surface of the work and is maintained in engagement with the latter by means of a weight 161 secured to the portion of the arm 122 extending laterally from the rockshaft 121.

Figures 18A, 19A:
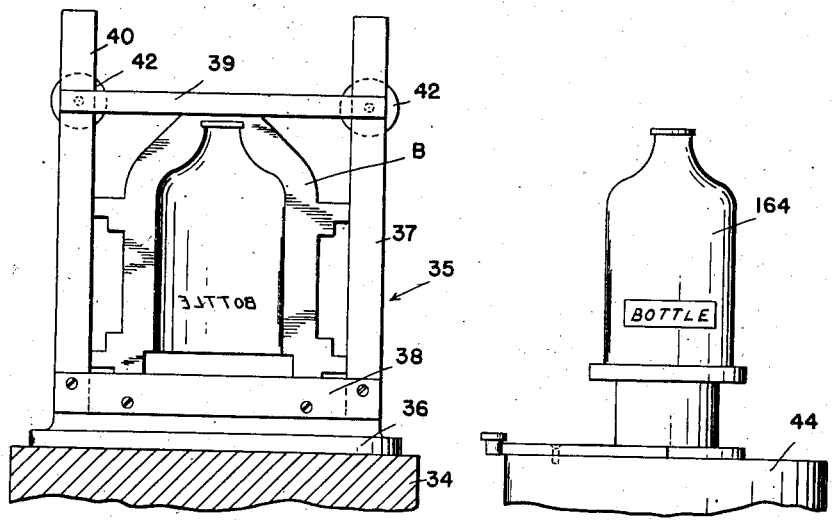
Figure 18A is a sectional view taken substantially on the plane indicated by the line 18A—18A of Figure 18.
Figure 19A is an elevational view of the pattern employed in connection with the engraving attachment.

Movement of the engraving tool 155 relative to the work is controlled by the optical unit E^a identical in construction to the optical unit E, with the exception that the mask 115 in the optical unit E is eliminated or, in other words, there is no restriction to the reflected light in the light sensitive cell. It will be noted from Figure 19A that the pattern 164 is identical to the pattern A, with the exception that indicia is applied to the outer surface thereof in a position it is desired to have the same assume on the work B. In the present instance, the indicia to be duplicated is white and the background is preferably black. The pattern 164 and the work B are fed and oscillated in the same manner previously described, with the result that as the light sensitive cell intercepts the light surfaces of the indicia, the electromagnet 157 is energized causing the plunger 156 to move in an inward direction and effecting an outward movement of the engraving tool into the work by reason of the connecting arm 158. On the other hand, when the line of sight of the photoelectric cell device intercepts the black background, the electromagnet is de-energized permitting the spring to move the plunger 156 outwardly for effecting movement of the engraving tool away from the work B. With this arrangement, it will be seen that the indicia on the pattern will be exactly duplicated on the work B.

Figure 22:
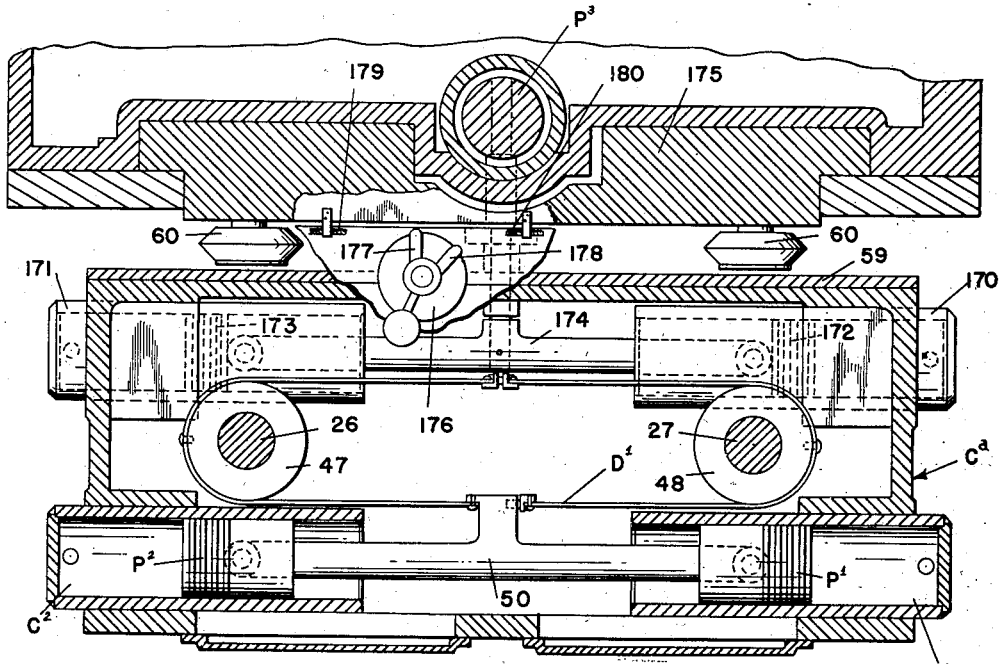
Figure 22 is a horizontal sectional view illustrating the adaptation of the modification in the machine.
Figure 20:
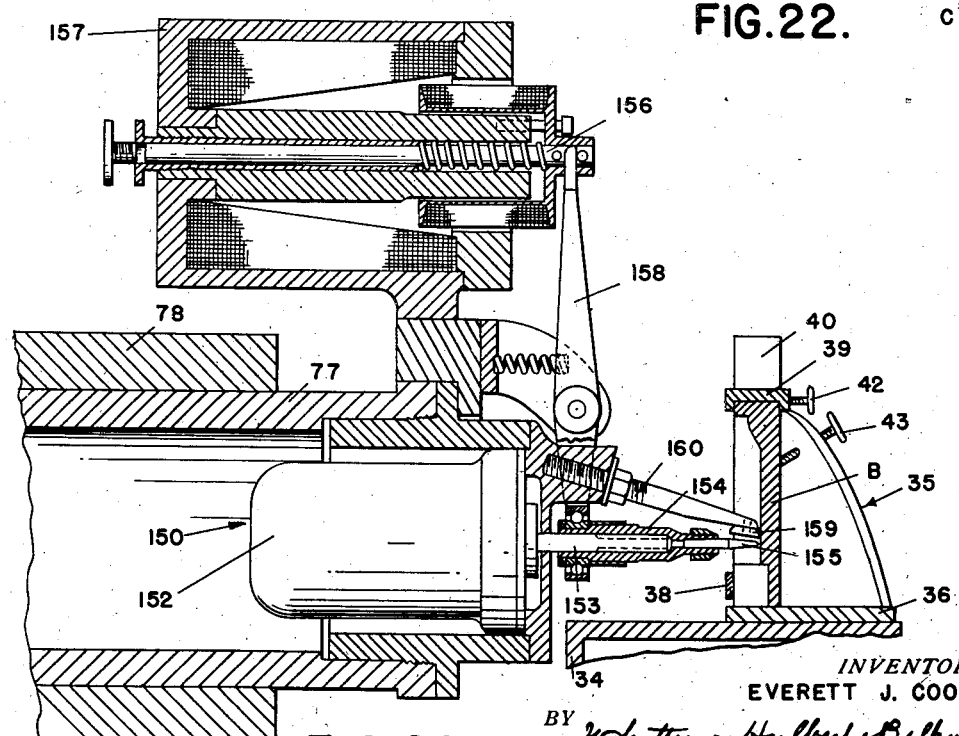
Figure 20 is a longitudinal sectional view through the engraving tool attachment.
Figure 21:
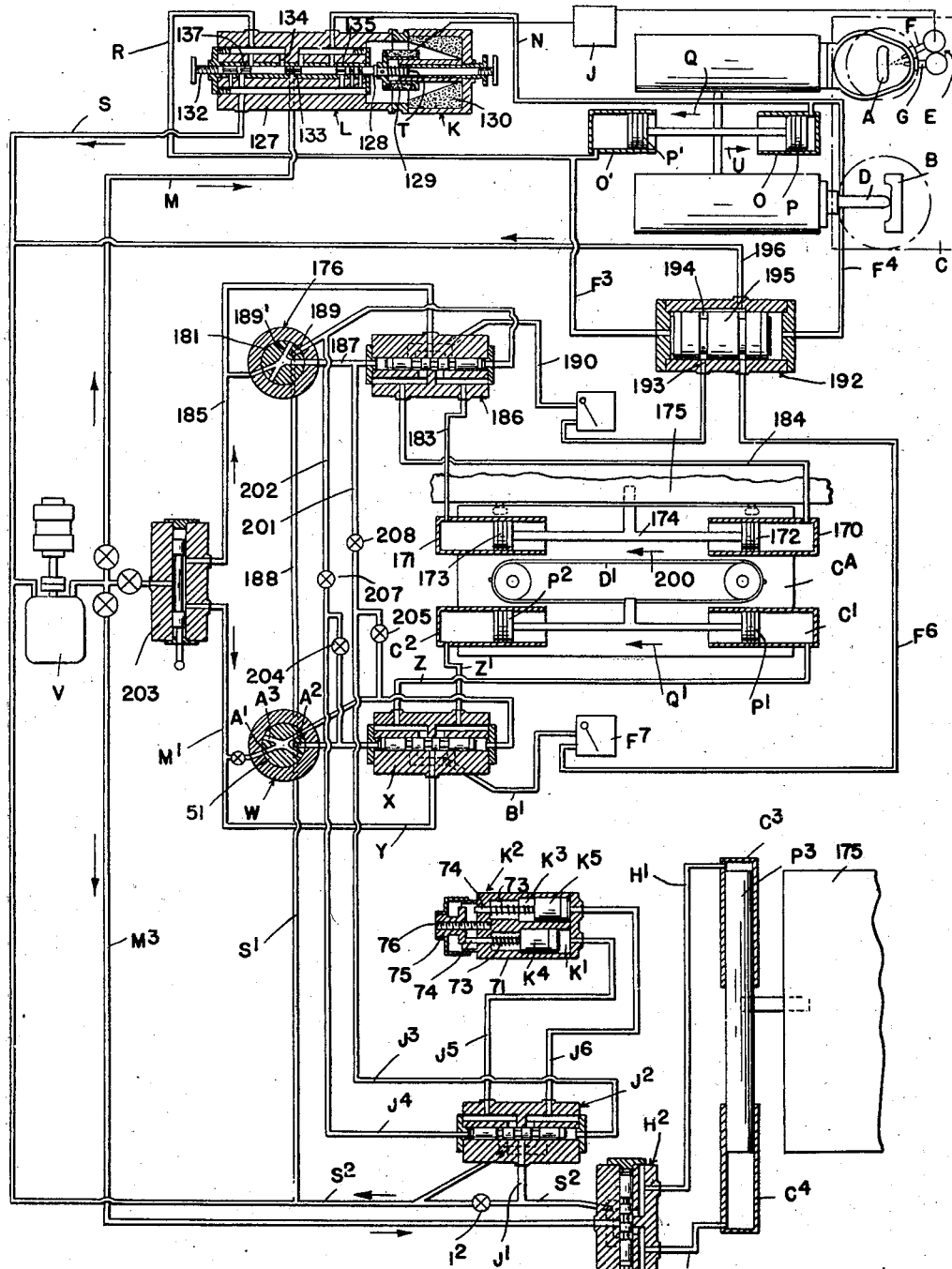
Figure 21 is a diagram of a modified form of construction.

The embodiment of the invention featured in Figures 21 to 23 inclusive, differs from the one illustrated in Figures 1 to 17 inclusive, in that fluid pressure operated means is substituted for the cam E¹ to reciprocate the carriage C^a in a horizontal plane. In detail, a pair of opposed axially aligned cylinders 170 and 171 are secured to the carriage C⁰ and respectively receive pistons 172 and 173. The pistons are integrally connected by means of a rod 174, and the rod is secured intermediate its ends to the vertical slide 175 corresponding to the slide G¹ in the first described form of the invention. The construction is such that transverse reciprocation of the carriage C⁰ is effected by moving the cylinders relative to the pistons, and this is accomplished by fluid pressure means supplied from the pump V. Upon reference to Figure 22, it will be noted that transverse movement of the carriage C⁰ is controlled by means of a valve 176 similar in design and function to the control valve W. The valve 176 is supported on the carriage C⁰ and is provided with two arms 177 and 178 respectively engageable with the adjustment stops 180 and 179 supported on the vertical slide 175. Both the arms are connected to the rotor of the valve diagrammatically shown in Figure 21 by the reference character 181, and the arrangement is such that when the arm 177 has been moved to its extreme position by the stop 180, fluid under pressure is admitted into the cylinder 171 through the conduit 183 and, when the arm 178 is moved to its extreme position by the adjustment stop 179, fluid under pressure is admitted into the cylinder 170 through the conduit 184.

It will be noted from Figure 21 that the conduits 183 and 184 communicate with the fluid pressure supply line 185 through the medium of the four-way valve 186 which, in turn, is actuated by the control valve 176. When the rotor 181 of the control valve 176 is in the position thereof shown in Figure 21, fluid under pressure is admitted to the front end of the four-way valve through the conduit 187, and the rear end of the valve communicates with the exhaust conduit 188 through the passage 189 in the control valve. As a result, the piston of the four-way valve 186 is moved rearwardly permitting fluid under pressure from the line 185 to flow into the cylinder 171 through the conduit 183, and permitting the cylinder 170 to exhaust through the conduit 184 to the passage 190 extending from the four-way valve. On the other hand, when the rotor 181 of the control valve is moved to its other extreme position, fluid under pressure is admitted from the supply line 185 through the passage 189' to the rear end of the four-way valve 186, and the forward end of the latter communicates with the exhaust line 188 through the passage 189 in the rotor 181 of the control valve 176. Consequently, fluid under pressure is supplied to the cylinder 170 through the conduit 184, and the cylinder 171 is exhausted through the conduit 183, valve 186 and conduit 190.

The discharge of exhaust from the line 190 is controlled by the stop valve 192 shown in Figure 23 as identical to the stop valve 13, with the exception that the opening 193 in the valve casing is connected to the conduit 190 instead of being plugged, as is the case in the first described form of the invention. In the present instance, the annular groove 194 in the piston 195 of the stop valve establishes communication between the exhaust conduit 190 and the main exhaust line 196 when the cutting tool is either being withdrawn or taking a uniform cut. On the other hand, when the tool is being fed into the work, the annular groove assumes a position out of registration with the conduit 190 and prevents exhaust of the cylinders 170 and 171. As a result of the foregoing, the transverse feed of the carriage is discontinued when the tool is being fed into the work.

The control valve 176 and the valve W for controlling the oscillatory movement of the work and pattern operate in timed relationship. From the positions of these valves and their associated four-way valves illustrated in Figure 21, it will be noted that when the valve W is in a position wherein fluid under pressure is discharged through the four-way valve X into the cylinder C¹ to move the piston P¹ in the latter cylinder in the direction of the arrow Q¹, the corresponding control valve 176 assumes a position wherein fluid under pressure is discharged through the four-way valve 176 into the cylinder 171 to move the latter in the direction of the arrow 200. It follows that when the control valves W and 176 are moved to their other extreme positions, fluid under pressure is admitted through the respective four-way valves to the cylinders 170 and C², respectively, and the opposed cylinders of each pair are exhausted through the four-way valves. In other words, the construction is such as to effect movement of the carriage in the same direction the work and pattern are oscillated.

Referring again to Figure 21, attention is called to the fact that the front and rear ends of the four-way valve 186 are respectively connected to the rear and front ends of the valve J² by conduits 201 and 202 in the same manner and for the same purpose as the four-way valve X is connected to the valve J². As pointed out above, the valve X is connected to the valve J² to restrict feeding of the vertical slide G¹ to the periods when the face plates carrying the work B and pattern A are at the end of their oscillatory movement and by connecting the four-way valve 186 to the valve J² in the same manner, vertical feed of the slide at the end of the transverse travel of the carriage is insured. In other words, the valve J² cannot be operated to control the vertical feed until both the control valves W and 176 are in one or the other extreme positions. It is true that the valve 176 is arranged to operate in unison with the valve W and, for this reason, would automatically assume a position wherein the carriage is at rest when the valve J² is operated by the valve W to effect the vertical feed of the slide 175. However, the connections 201 and 202 from the valve 176 to the valve J² are important in order to provide satisfactory operation in cases where the oscillatory movement of the pattern A and work are discontinued. This may be accomplished by operating the valve 203 to close communication between the pressure line M¹ and source of supply V. In this event, the valves 204 and 205 are also closed to prevent escape of fluid pressure from the transverse feed section of the system to the oscillatory unit of the system. On the other hand, if it is desired to discontinue the transverse feed, the valve 203 is operated to close the line 185 and the valves 207 and 208 are closed to prevent the flow of fluid from the oscillatory part of the system to the part controlling the transverse feed.

Figure 25:
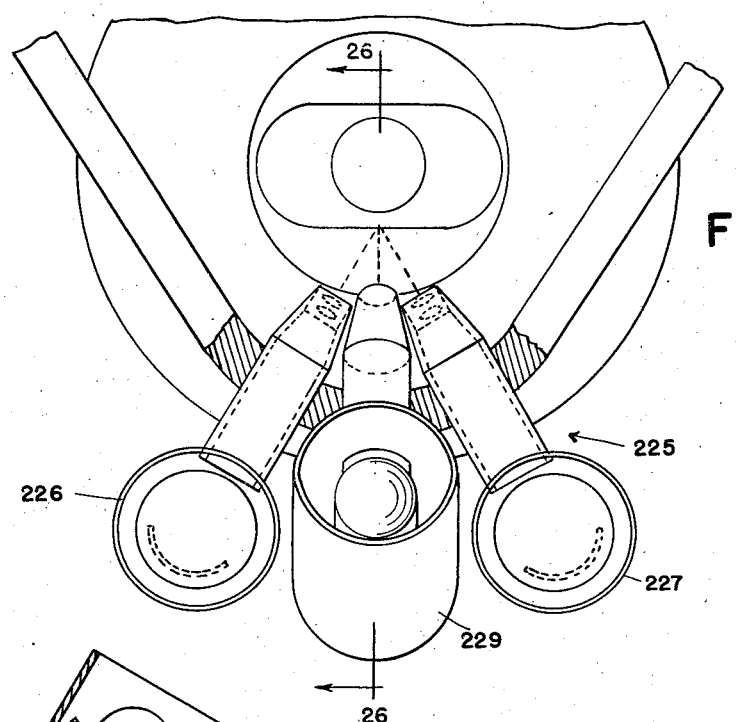
Figure 25 is a plan view of a modified construction of optical unit.
Figure 26:
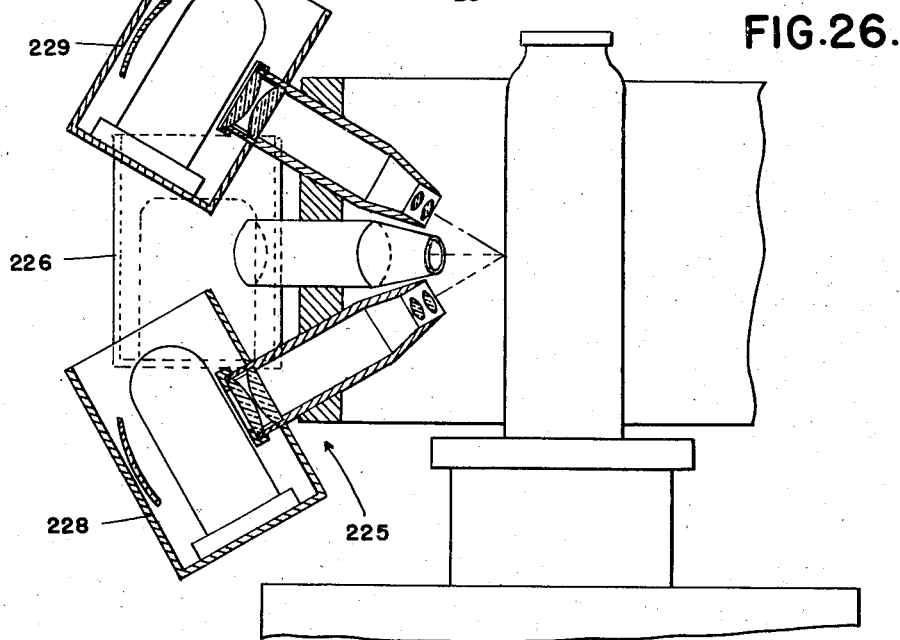
Figure 26 is a sectional view taken substantially on the plane indicated by the line 26—26 of Figure 25.

The embodiment of the invention illustrated in Figures 25 and 26 discloses a construction wherein the optical unit 225 is fixed at all times, as distinguished from the optical unit E previously described as adjustable to effectively illuminate curved or arcuate surfaces of the pattern. In the present instance, the optical unit 225 comprises two photoelectric cells 226 and 227 in series and also two projectors 228 and 229. The projectors are disposed between the photoelectric cells and are positioned on opposite sides of the horizontal plane intersecting the surface of the pattern to be scanned. The upper projector 229 is inclined at a predetermined angle with respect to the horizontal plane aforesaid and the lower projector 228 is inclined at the same angle to the horizontal plane. The direction of inclination of both projectors is such that the light beams intersect each other at the surface of the pattern being scanned.

The photoelectric cells are fixed with respect to the projectors and are arranged on opposite sides of a vertical plane intersecting the surface of the pattern and including the point of intersection of the projectors. The photoelectric cell 226 is inclined at a predetermined angle to the vertical plane at one side thereof, while the photoelectric cell 227 is inclined at the same angle to said plane at the opposite side of the latter, and the lines of sight of the two photoelectric cells intersect each other at the surface of the pattern on the point of intersection of the beams of light supplied by the projectors.

It will, of course, be understood that if both photoelectric cells were used in the mold cutting operation, difficulty would be encountered in controlling the cutting tool to the accurate extent required to form in the mold an exact replica of the surface of the pattern being scanned. For this reason, one of the photoelectric cells is rendered inoperative during the cutting operation and the two projectors are used with the remaining photoelectric cell. By providing two projectors in the optical system in the manner previously set forth, one of the light beams will always be at such an angle to the surface as to provide a sharply defined contour line, irrespective of the curvatures of the pattern. For example, when the neck portion of the bottle is positioned for scanning by the photoelectric cell, the beam of light from the upper projector is substantially normal to the curved surface, so that the image is effectively illuminated even though the lower beam is directed across or tangentially to the curved surface.

The optical system featured in Figures 25 and 26 may also be used in association with the engraving tool. When used for this purpose, one of the projectors is preferably rendered inoperative to avoid the necessity of accurately coinciding the beams of light of the reflectors on the relatively small indicia to be cut in the mold. Both of the photoelectric cells are employed, however, to effect a more uniform cut of the engraving tool, irrespective of variations in the intensity of the reflected light. In other words, as the model is oscillated relative to the optical unit, the angle of reflection of the beam of light changes and effects a variation in the intensity of the reflected light scanned by one of the photoelectric cells. This variation effects the operation of the latter photoelectric cell and, if this cell is the only one controlling the feed of the engraving tool, the operation of the latter will also be varied. However, with the present construction, wherein two photoelectric cells are arranged in series upon opposite sides of the projector in a plane parallel to the plane of oscillation of the pattern, if one cell becomes ineffective due to variations in intensity of reflected light, the other cell will supplement the action of the first and produce a uniform feed of the engraving tool.

While it will be apparent from the foregoing description of the invention that the latter contemplates numerous novel features, nevertheless, one of the most important of these features consists in an optical system wherein the angle between the beam of light supplied by the projector and the line of sight of the photoelectric cell is fixed and remains the same, irrespective of any relative movement between the pattern and the carriage for the optical system.

What I claim as my invention is:

1. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, means controlled by the light sensitive cell for relatively moving the pattern and optical unit toward and away from each other to maintain the point of intersection of the line of sight of said cell device with the contour line of the image on the surface of the pattern, a tool positioned adjacent the work, and means effective upon relative movement of the optical unit and pattern toward and away from each other to correspondingly relatively move the tool and work toward and away from each other.

2. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, means for relatively moving the supporting means and optical unit in a direction to cause the contour line to progress across the pattern, means controlled by the light sensitive cell for relatively moving the pattern and optical unit toward and away from each other to maintain the point of intersection of the line of sight of said cell device with the contour line of the image on the surface of the pattern, a tool positioned adjacent the work, and means effective upon relative movement of the optical unit and pattern toward and away from each other to correspondingly relatively move the tool and work toward and away from each other.

3. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, means for relatively moving the optical unit and the supporting means for the work and pattern in a direction to cause the contour line of the image to progress across the pattern, means for also relatively moving the supporting means and optical unit predetermined increments in a direction to cause the contour line of the image to move along the pattern substantially perpendicular to the direction of relative movement aforesaid, means controlled by the optical unit for relatively moving the pattern and cell toward and away from each other to maintain the point of intersection of the line of sight of said cell with the contour line of the image on the surface of the pattern, a tool positioned adjacent the surface of the work to be cut, and said last named means also effecting relative movement of the work and tool toward and away from each other to locate the tool relative to the work in accordance with the location of the cell unit relative to the pattern.

4. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, means for relatively reciprocating the optical unit and the supporting means for the work and pattern in directions to cause the contour line of the image to progress across the pattern, means effective at the end of each stroke for relatively moving said supporting means and optical unit predetermined increments in a direction to cause the contour line to move along the pattern substantially perpendicular to the direction of relative movement aforesaid, means controlled by the optical unit for relatively moving the pattern and unit toward and away from each other to maintain the point of intersection of the line of sight of said cell with the contour line of the image on the surface of the pattern, a tool positioned adjacent the work, and said last named means also effecting relative movement of the work and tool toward and away from each other.

5. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, means for relatively reciprocating the optical unit and the supporting means for the work and pattern in directions to cause the contour line of the image to progress across the pattern, means effective at the end of each stroke for relatively moving said supporting means and optical unit predetermined increments in a direction to cause the contour line to move along the pattern substantially perpendicular to the direction of relative movement aforesaid, means controlled by the optical unit for relatively moving the pattern and unit toward and away from each other to maintain the point of intersection of the line of sight of said cell with the contour line of the image on the surface of the pattern, a tool positioned adjacent the work, said last named means also effecting relative movement of the work and tool toward and away from each other to locate the tool relative to the work in accordance with the position of the optical unit relative to the pattern, and means discontinuing the cross and perpendicular feed means aforesaid when the work and tool are relatively moved toward each other.

6. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, means for relatively moving the pattern and optical unit in a direction to cause the contour line to progress across the pattern, means controlled by the optical unit for relatively moving the pattern and optical unit toward and away from each other to maintain the point of intersection of the line of sight of said cell device with the contour line of the image on the surface of the pattern, a tool positioned adjacent the work, means effective upon relative movement of the optical unit and pattern toward and away from each other to correspondingly relatively move the tool and work toward and away from each other, and means effective when the work and tool are relatively moved toward each other to render the cross feed means aforesaid inoperative.

7. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, means for moving both the pattern and work as a unit in a transverse direction to cause the contour line of the image to progress across the pattern, means controlled by said optical unit for moving the latter toward and away from the pattern to maintain the point of intersection of the line of sight of said cell with the contour line of the image on the surface of said pattern, a tool supported opposite one face of the work and operatively connected to the last named means for movement relative to the work as a unit with the optical unit, and means discontinuing the operation of the transverse feed when the tool is moved toward the work.

8. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, a tool supported opposite the work, means for oscillating both the work and pattern relative to the tool, and optical unit, and means controlled by said optical unit for relatively moving the pattern and optical unit toward and away from each other and for also relatively moving the work and tool relative to each other.

9. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, a tool supported opposite the work, means for oscillating both the work and pattern relative to the tool and optical unit, means for relatively moving the optical unit and supporting means aforesaid linearly in a direction to cause the contour line to progress across the pattern, and means controlled by said optical unit for relatively moving the pattern and optical unit toward and away from each other and for also relatively moving the work and tool toward and away from each other.

10. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, a tool supported opposite the work, means for oscillating both the work and pattern relative to the tool and optical unit, means for reciprocating the work and pattern relative to the tool and optical unit in directions to cause the contour line to progress across the pattern, said oscillating and reciprocating means operating in timed relation so that the ends of the oscillatory movements coincide with the ends of reciprocable strokes, means effective at the ends of both the recriprocable and oscillatory movements of the work and pattern to move the latter predetermined increments in a direction perpendicular to the reciprocable movement aforesaid, and means controlled by the optical unit for moving the latter and tool in directions toward and away from the pattern and work.

11. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, a tool supported opposite the work, means for oscillating both the work and pattern relative to the tool and optical unit, means controlled by said optical unit for relatively moving the pattern and optical unit toward and away from each other and for also relatively moving the work and tool relative to each other, and means effective when the work and tool are relatively moved toward each other to render the oscillating means inoperative.

12. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, a tool supported opposite the work, means for oscillating both the work and pattern relative to the tool and optical unit, means for relatively moving the optical unit and supporting means aforesaid linearly in a direction to cause the contour line to progress across the pattern, means controlled by said optical unit for relatively moving the pattern and optical unit toward and away from each other and for also relatively moving the work and tool toward and away from each other, and means effective when the work and tool are relatively moved toward each other to render both the oscillating and linear feed means inoperative.

13. In a duplicating machine, the combination with means for supporting a pattern and a work blank, of an optical unit having means for casting a beam of light on the pattern to produce an image on the surface of the pattern having a contour line representing one section of the pattern, said optical unit also provided with a light sensitive cell device controlled by the reflection of light from the pattern and having a line of sight intersecting the edge of the contour line on the surface of the pattern, a tool supported opposite the work, means for oscillating both the work and pattern relative to the tool and optical unit, means for reciprocating the work and pattern relative to the tool and optical unit in directions to cause the contour line to progress across the pattern, said oscillating and reciprocating means operating in timed relation so that the ends of the oscillatory movements coincide with the ends of reciprocable strokes, means effective at the ends of both the reciprocable and oscillatory movements of the work and pattern to move the latter predetermined increments in a direction perpendicular to the reciprocable movement aforesaid, means controlled by the optical unit for moving the latter and tool in directions toward and away from the pattern and work, and means effective when the tool is moved toward the work to render said oscillating, reciprocating and perpendicular feed means inoperative.

14. In a duplicating machine, the combination with means for supporting a pattern and a work blank, of a cutter movable into and out of engagement with the work, an optical unit having means for casting a beam of light on the pattern to produce an image on one surface of the pattern and having a light sensitive cell controlled by the reflection of light from the pattern, and fluid pressure actuated means controlled by the optical unit for moving the latter and tool as a unit relative to the pattern and work respectively.

15. In a duplicating machine, the combination with means for supporting a pattern and a work blank, of an optical unit having means positioned at one side of the pattern for casting a beam of light on the pattern to produce an image on one surface of the pattern and having a light sensitive cell at the same side of the pattern and controlled by the reflection of light from the pattern, a tool supported adjacent the work, fluid pressure actuated means for relatively moving the optical unit and pattern toward and away from each other and for simultaneously relatively reciprocating the work and tool, and a valve actuated by the light sensitive cell for controlling the operation of said fluid pressure actuated means.

16. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively moving the pattern and optical unit in a direction to cause the image to progress across the pattern and for effecting a corresponding relative movement of the work and tool, and fluid pressure actuated means controlled by the optical unit for moving the latter and tool relative to the pattern and work in directions toward and away from the latter.

17. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively moving the pattern and optical unit in a direction to cause the image to progress across the pattern and for effecting a corresponding relative movement of the work and tool, fluid pressure actuated means for moving the optical unit and tool relative to the pattern and work in directions toward and away from the latter, means actuated by the light sensitive cell for controlling the last named means, and means actuated by the controlling means for rendering the first named fluid pressure actuated means inoperative when the tool and work are relatively moved toward each other.

18. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively reciprocating the pattern and optical unit in directions to cause the image to progress across the pattern and for effecting a corresponding relative reciprocation of the work and tool, fluid pressure actuated means for moving the optical unit and tool relative to the pattern and work in directions toward and away from the latter, a valve actuated by the light sensitive cell for controlling the last named means, and a second valve controlled by the valve aforesaid to prevent the operation of the first named fluid pressure actuated means when said tool and work are relatively moved toward each other.

19. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively reciprocating the pattern and optical unit in directions to cause the image to progress across the pattern and for effecting a corresponding relative reciprocation of the work and tool, means controlled by said fluid pressure actuated means for oscillating the work and pattern relative to the tool and optical unit, fluid pressure actuated means controlled by the optical unit for moving the latter and tool relative to the pattern and work in directions toward and away from the latter, and means also controlled by the optical unit for rendering said reciprocating and oscillating means inoperative when the tool and work are relatively moved toward each other.

20. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively reciprocating the pattern and optical unit in directions to cause the image to progress across the pattern and for effecting a corresponding relative reciprocation of the work and tool, fluid pressure actuated means controlled by the optical unit for moving the cell and tool relative to the pattern and work in directions toward and away from the latter, and means also controlled by the optical unit for rendering the first named fluid pressure actuated means inoperative when the tool and work are relatively moved toward each other.

21. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively reciprocating the pattern and optical unit in directions to cause the image to progress across the pattern and for effecting a corresponding relative reciprocation of the work and tool, means operated by the fluid pressure actuated means for alternately reversing the direction of relative movement, and additional fluid pressure actuated means controlled by the optical unit for moving the latter and tool relative to the pattern and work in directions toward and away from the latter.

22. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively reciprocating the pattern and optical unit in directions to cause the image to progress across the pattern and for effecting a corresponding relative reciprocation of the work and tool, means controlled by said fluid pressure actuated means for oscillating the work and pattern relative to the tool and optical unit, means operated by the fluid pressure actuated means for alternately reversing the direction of reciprocation and for also reversing the direction of oscillation, and fluid pressure actuated means controlled by the optical unit for relatively moving the latter and pattern toward and away from each other and for also relatively moving the tool and work toward and away from each other.

23. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, and fluid pressure actuated means controlled by the light sensitive cell for relatively moving the optical unit and pattern toward and away from each other and for also relatively moving the tool and work toward and away from each other.

24. In a duplicating machine, the combination with means for supporting a pattern and a work blank, of an optical unit having means for casting a beam of light on the pattern and having a light sensitive cell controlled by the reflection of light from the pattern, a tool supported adjacent the work, fluid pressure actuated means for relatively moving the pattern and optical unit in a direction to cause the image to progress across the pattern and for effecting a corresponding relative movement of the work and tool, means for relatively moving the optical unit and pattern toward and away from each other and for also relatively moving the tool and work toward and away from each other, and means controlled by the light sensitive cell for actuating said last named means.

25. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively moving the pattern and optical unit in a direction to cause the image to progress across the pattern and for effecting a corresponding relative movement of the work and tool, means for relatively moving the optical unit and pattern toward and away from each other and for also relatively moving the tool and work toward and away from each other, means controlled by the light sensitive cell for actuating said last named means, and means also controlled by said cell for rendering the fluid pressure means inoperative when the tool and work are relatively moved toward each other.

26. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, means for relatively moving the pattern and optical unit predetermined increments in one direction and for effecting a corresponding relative movement of the tool and work, and means controlled by the optical unit for relatively moving the latter and pattern toward and away from each other and for also relatively moving the work and tool toward and away from each other.

27. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for moving both the pattern and work predetermined increments in one direction relative to the optical unit and tool, fluid pressure actuated means for moving the tool and optical unit relative to the work and pattern in directions toward and away from the latter, and means controlled by the light sensitive cell for controlling the operation of the last named means.

28. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for moving both the pattern and work predetermined increments in one direction relative to the optical unit and tool, fluid pressure actuated means for moving the tool and optical unit relative to the work and pattern in directions toward and away from the latter, valve means actuated by said light sensitive cell for controlling the operation of the last named means, and means also actuated by the light sensitive cell to render said first named fluid pressure actuated means inoperative when the tool is moved toward the work.

29. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively moving the pattern and optical unit in a direction to cause the image to progress across the pattern and for effecting a corresponding relative movement of the work and tool, fluid pressure actuated means for relatively moving the pattern and optical unit predetermined increments in a direction to cause the image to progress along the pattern perpendicular to the path of movement aforesaid and for effecting a corresponding relative movement of the tool and work, additional fluid pressure actuated means for relatively moving the optical unit and pattern toward and away from each other and for also relatively moving the work and tool toward and away from each other, and valve means actuated by the light sensitive cell for controlling the operation of the last named means.

30. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively moving the pattern and optical unit in a direction to cause the image to progress across the pattern and for effecting a corresponding relative movement of the work and tool, fluid pressure actuated means for relatively moving the pattern and optical unit predetermined increments in a direction to cause the image to progress along the pattern perpendicular to the path of movement aforesaid and for effecting a corresponding relative movement of the tool and work, additional fluid pressure actuated means for relatively moving the optical unit and pattern toward and away from each other and for also relatively moving the work and tool toward and away from each other, valve means actuated by the light sensitive cell for controlling the operation of the last named means, and means also actuated by the light sensitive cell to render the first and second named fluid pressure actuated means inoperative when the tool and work are relatively moved toward each other.

31. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively moving the pattern and optical unit in a direction to cause the image to progress across the pattern and for effecting a corresponding relative movement of the work and tool, means actuated by the said fluid pressure actuated means for oscillating the work and pattern, fluid pressure actuated means for moving the pattern and work predetermined increments in a direction to cause the image to progress along the pattern perpendicular to the path of movement aforesaid, additional fluid pressure actuated means for moving the optical unit and tool relative to the pattern and work toward and away from the latter, and valve means actuated by the light sensitive cell for controlling the operation of the last named means.

32. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively reciprocating the pattern and optical unit in directions to cause the image to progress across the pattern and for effecting a corresponding relative reciprocation of the work and tool, means operated by the fluid pressure actuated means for alternately reversing the direction of relative movement, fluid pressure actuated means controlled by the last named means and effective at the end of each stroke of the relative movement aforesaid to relatively move the pattern and optical unit predetermined increments in a direction to cause the image to progress along the pattern perpendicular to the path of movement aforesaid and to also effect corresponding relative movement of the work and tool, additional fluid pressure actuated means for relatively moving the optical unit and pattern toward and away from each other and for also relatively moving the work and tool toward and away from each other, and valve means actuated by the light sensitive cell for controlling the operation of the last named means.

33. In a duplicating machine, the combination with means for supporting a pattern and a work blank, of an optical unit having means for casting a beam of light on the pattern to produce an image on one surface of the pattern and having a light sensitive cell controlled by the reflection of light from the pattern, a tool supported adjacent the work, fluid pressure actuated means for relatively reciprocating the pattern and optical unit in directions to cause the image to progress across the pattern and for effecting a corresponding relative reciprocation of the work and tool, fluid pressure actuated means effective at the end of each reciprocable stroke aforesaid to move the pattern and work predetermined increments in a direction to cause the image to progress along the pattern perpendicular to the path of movement aforesaid, additional fluid pressure actuated means for moving the optical unit and tool relative to the pattern and work toward and away from the latter, and valve means actuated by the light sensitive cell for controlling the operation of the last named means.

34. In a duplicating machine, an optical unit having means for casting a beam of light toward an object to produce an image on the latter and having a light sensitive cell device supported in fixed relation to said means with the line of sight intersecting one side of the image on the object, means supporting the object and optical unit for relative movement toward and away from each other, and means controlled by the light sensitive cell for effecting relative movement of the object and optical unit.

35. In a duplicating machine, an optical unit having means for casting a beam of light toward an object to produce an image on the latter and having a light sensitive cell device supported in fixed relation to said means with the line of sight intersecting one side of the image on the object, means supporting the object and optical unit for relative movement toward and away from each other, and fluid pressure actuated means controlled by the light sensitive cell for effecting relative movement of the object and optical unit.

36. In a duplicating machine, an optical unit comprising projectors having means for casting beams of light toward an object and fixed relative to each other in a plane so that the beams of light intersect at the adjacent surface of the object to form an image, and light sensitive cells fixed relative to each other and relative to said projectors in a plane transverse to the plane aforesaid and having lines of sight intersecting at one edge of the image.

37. In a duplicating machine, an optical unit comprising projectors having means for casting beams of light toward an object and arranged so that the beams of light intersect at the adjacent surface of the object to form an image, a light sensitive cell fixed with respect to the projectors and having a line of sight intersecting one side edge of the image, means supporting the optical unit and object for relative movement in directions toward and away from each other to maintain the intersection aforesaid of the light beams and line of sight of the cell on the object, and means controlled by the light sensitive cell for moving said optical unit.

38. In a duplicating machine, a support for an object having a surface to be duplicated, an optical unit supported opposite the surface of the object to be reproduced and comprising an illuminating device and a photoelectric cell device, means associated with the illuminating device for casting a light image on the surface of the object to be reproduced, a light sensitive cell associated with the photoelectric cell device, a plate supported between the object and light sensitive cell and having an aperture therethrough, means for focusing the light image reflected from the object onto the plate, means controlled by the photoelectric cell device for relatively moving the optical unit and object to maintain one edge of the reflected image in registration with the aperture, and means effecting relative movement of the object and optical unit to cause the surface of the object to be traversed by said unit.

39. In a duplicating machine, a support for an object having a surface to be duplicated, an optical unit supported opposite the surface of the object to be reproduced and comprising an illuminating device for casting a light image on the surface of the object to be reproduced and a photoelectric cell device for scanning the image at a fixed angle to the beam of light cast by the illuminating means, means controlled by the photoelectric cell device for relatively moving the optical unit and object toward and away from each other to maintain the point of intersection of the beam of light and scanning line at the surface of the object to be reproduced, and means effecting relative movement of the object and optical unit to cause the surface of the object to be traversed by the optical unit.

40. In a duplicating machine, a support for a work blank, a support for an object having a surface to be duplicated on the blank, an optical unit supported opposite the surface of the object to be reproduced for movement toward and away from the latter and comprising an illuminating device and a photoelectric cell device, means associated with the illuminating device for casting a light image on the surface of the object to be reproduced, means associated with the photoelectric cell device for scanning the image at a fixed angle with respect to the beam of light cast by the illuminating device, means controlled by the photoelectric cell device for maintaining the optical unit in a position relative to the object wherein the point of intersection of the light beam and the scanning line of the photoelectric cell device is maintained on the surface of the object to be reproduced, means effecting relative movement of the object and optical unit to cause the surface of the object to be traversed by the optical unit, and a tool movable with the optical unit relative to the work blank.

EVERETT J. COOK.